(12) United States Patent
Stein et al.

(10) Patent No.: US 10,467,213 B2
(45) Date of Patent: *Nov. 5, 2019

(54) SEARCH INDICES FOR SOCIAL PLUG-INS

(71) Applicant: Facebook, Inc., Menlo Park, CA (US)

(72) Inventors: Alexander P. Stein, San Francisco, CA (US); Michael Yehuda Rothschild, Sunnyvale, CA (US); Ravit Bennier, Menlo Park, CA (US); Tirunelveli R. Vishwanath, Sunnyvale, CA (US); Ethan Charles Stock, Belmont, CA (US); Varun Vikram Bhartia, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/923,095

(22) Filed: Oct. 26, 2015

(65) Prior Publication Data

US 2017/0116239 A1 Apr. 27, 2017

(51) Int. Cl.
*G06F 16/22* (2019.01)
*G06F 16/901* (2019.01)
(Continued)

(52) U.S. Cl.
CPC ............ *G06F 16/2228* (2019.01); *G06F 9/54* (2013.01); *G06F 16/9024* (2019.01); *H04L 67/22* (2013.01); *H04L 67/306* (2013.01)

(58) Field of Classification Search
CPC .......... G06F 17/3053; G06F 17/30867; G06F 17/3033; G06F 17/30466; G06F 17/30598;
(Continued)

(56) References Cited

U.S. PATENT DOCUMENTS 8,903,770 B2 * 12/2014 Kucera ............... G06F 17/3089
707/631
2008/0222295 A1 * 9/2008 Robinson .......... G06F 17/30867
709/227

(Continued)

OTHER PUBLICATIONS

Batrinca et al., Social media analytics: a survey of techniques, tools and platforms, Jul. 26, 2014, Springerlink.com, all pages. (Year: 2014).*

(Continued)

*Primary Examiner* — Jay A Morrison
*Assistant Examiner* — Antonio J Caiado
(74) *Attorney, Agent, or Firm* — Baker Botts L.L.P.

(57) ABSTRACT

A method includes receiving, from a first application via a social plug-in associated with the online social network, a request for content from a second application. The content may be related to an entity associated with the online social network. The first application may be a third party application. The request may include an entity-identifier of the entity, an application-identifier of the first application, and a deep link to the first application including instructions for accessing a display state of the first application associated with the request. The method further includes accessing a deep-link index of the online social network including a plurality of records indexing deep-links to third-party applications, and then generating a record in the deep-link index corresponding to the requested entity. The record may include the entity-identifier of the entity, the application-identifier of the first application, and the deep link to the first application.

22 Claims, 25 Drawing Sheets

(51) Int. Cl.
*H04L 29/08* (2006.01)
*G06F 9/54* (2006.01)

(58) Field of Classification Search
CPC ......... G06F 17/30917; G06F 17/30498; G06F 17/30321; G06F 17/2235; G06F 17/30607; G06F 17/30696; G06F 16/2228; G06F 16/9024; G06F 9/54; H04L 51/32; H04L 67/22; H04L 67/306; G06Q 30/02; G06Q 30/0269; G06Q 50/01; H04N 21/812
USPC .................................................. 707/600–899
See application file for complete search history.

(56) References Cited

U.S. PATENT DOCUMENTS

| | | | | |
|---|---|---|---|---|
| 2009/0049525 A1* | 2/2009 | D'Angelo | ............ | G06F 21/6245 726/4 |
| 2011/0131504 A1* | 6/2011 | Shustef | ............... | G06F 17/3089 715/745 |
| 2011/0154445 A1* | 6/2011 | Schmidt-Karaca | .... | G06Q 10/10 726/4 |
| 2011/0196855 A1* | 8/2011 | Wable | ............... | G06F 17/30631 707/711 |
| 2013/0124542 A1* | 5/2013 | Lee | ................... | G06F 17/30392 707/751 |
| 2013/0179427 A1* | 7/2013 | Archambault | .... | G06F 17/30867 707/711 |
| 2013/0191372 A1* | 7/2013 | Lee | ................... | G06F 17/30958 707/722 |
| 2013/0212496 A1* | 8/2013 | Antebi | .............. | G06F 17/30893 715/760 |
| 2014/0164132 A1* | 6/2014 | Chia | ................... | G06Q 30/0269 705/14.64 |
| 2014/0164141 A1* | 6/2014 | Matus | ..................... | G06Q 50/01 705/14.68 |
| 2014/0164481 A1* | 6/2014 | Chia | ....................... | H04L 67/22 709/203 |
| 2014/0164511 A1* | 6/2014 | Williams | .............. | H04L 67/306 709/204 |
| 2014/0244753 A1* | 8/2014 | Tseng | ............... | H04N 21/26291 709/204 |
| 2014/0372545 A1* | 12/2014 | Lee | ........................ | G06Q 50/01 709/206 |
| 2015/0127729 A1* | 5/2015 | Madhavan | ........ | G06F 17/30867 709/204 |
| 2015/0149289 A1* | 5/2015 | St. Clair | ............ | G06Q 30/0264 705/14.61 |
| 2015/0334101 A1* | 11/2015 | Bruchner | ................ | G06Q 10/10 726/3 |
| 2016/0042050 A1* | 2/2016 | Chen | ....................... | G06F 9/445 707/740 |
| 2016/0191639 A1* | 6/2016 | Dai | .................... | G06Q 30/0255 709/204 |

OTHER PUBLICATIONS

Taivalsaari et al., Web Browser as an Application Platform: The Lively Kernel Experience, Jan. 2008, SMLI TR-2008-175, all pages. (Year: 2008).*
https://en.wikipedia.org/wiki/Mobile_deep_linking, Oct. 22, 2015.
https://en.wikipedia.org/wiki/Plug-in_(computing), Oct. 26, 2015.

* cited by examiner

SEARCH INDICES FOR SOCIAL PLUG-INS

TECHNICAL FIELD

This disclosure generally relates application plug-ins for application-to-application linking, and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A user interface (UI), in the industrial design field of human-machine interaction, is the space where interactions between humans and machines occur. The goal of the interactions between a human, often referred to as a "user," and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands. A user interface may allow users to interact with a social-networking system.

SUMMARY OF PARTICULAR EMBODIMENTS

In particular embodiments, a user viewing an application (e.g., a social-networking application) running on a client system (e.g., a smartphone) may select a displayed interactive element to display a specific piece of content (e.g., third-party content, social networking content, etc.) in response to the activation of a social plug-in on the application. For example, the social plug-in may be activated from a third-party application, causing the social plug-in to generate an interactive notification element (e.g., a "bubble") within the third-party application. This notification element may contain social-network content passed directly to the notification element via the social plug-in, and may bypass retaining and/or storing any social-network content on the third-party application. In particular embodiments, the social-networking system may display first content associated with a first application on a user interface of a client device. The first content may be related to an entity associated with the online social network, and the first application may be a third-party application. The social-networking system may then present for persistent display a first interactive element associated with a second application on the user interface. The first interactive element may be persistently displayed on the user interface until the client device receives a first user input selecting the interactive element. Next, the social-networking system may access, upon receiving the first user input selecting the first interactive element, a deep-link index of the online social network to retrieve a deep link to the second application indexed with the entity, and then execute, at the client device, the retrieved deep link to present the display state (e.g., view state) of the second application associated with the entity. The deep link to the second application may include instructions for accessing a display state of the second application associated with the entity, and the display state of the second application may include at least second content related to the entity.

In particular embodiments, the social-networking system may build an index of deep links associated with particular entities of the social-networking system, in which each indexed deep link is a link to particular content associated with that entity within a third-party application. The index is built using information received from a social plug-in, wherein third-party applications use the social plug-in to fetch social-network content, in addition to third-party content, related to particular social-network entities, and where these calls include deep link information indicating the specific location within the third-party application where the social-network entity is referenced. In particular embodiments, the social-networking system may receive, via a social plug-in associated with the online social network, a request for content from a second application. The content may be related to an entity associated with an online social network, and the first application may be a third-party application. The request may include an entity-identifier of the entity, an application-identifier of the first application, and a deep link to the first application comprising instructions for accessing a display state of the first application associated with the request. The social-networking system may then access a deep-link index of the online social network including a plurality of records indexing deep-links to the third-party applications, and then generate a record in the deep-link index corresponding to the requested entity. The record includes the entity-identifier of the entity, the application-identifier of the first application, and the deep link to the first application.

In particular embodiments, the social-networking system may use the above-described deep-link index to search and retrieve specific content within a third-party application from either an application associated with the social-networking system, or from a second third-party application. When the user is interacting with the third-party application, a social plug-in associated with the social-networking system may be used to search and retrieve specific social-networking content and present this content within the interface of the third-party application (e.g., without requiring the user to open a separate application to view the social-networking content). In addition, the social plug-in may be used to search and retrieve specific content from a second third-party application and present this content within the interface of the (first) third-party application (e.g., third-party to third-party application search, via the social plug-in associated with the social-networking system, without requiring the user to open a separate application to view the content from the second third-party application). In particular embodiments, the social-networking system may receive, from a client device of a first user of the online social network, a query identifying a first entity associated with the online social network, and then access a deep-link index of the online social network including a plurality of records of indexed deep-links to a plurality of third-party applications. Each record may include an entity-identifier of an entity of the online social network, an application-identifier of the third-party application, and a deep link to the third-party application including instructions for accessing a display state of the third-party application associated with the entity. Then, the social-networking system may identify one or more records of the deep-link index having an entity-identifier matching the identified first entity of the query. After one or more matching records are identified, the social-networking system may then send, to the client device of the first user, the one or more search results responsive to the query. In particular, the one or more of the search results may include deep links corresponding to one or more of the identified records, each deep link being selectable by the first user to access a display state of a third-party application associated with the first entity of the query.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 10 illustrates an example method for interacting with one or more interactive elements activated by a social plug-in.

DESCRIPTION OF EXAMPLE EMBODIMENTS

System Overview

Figure 1:
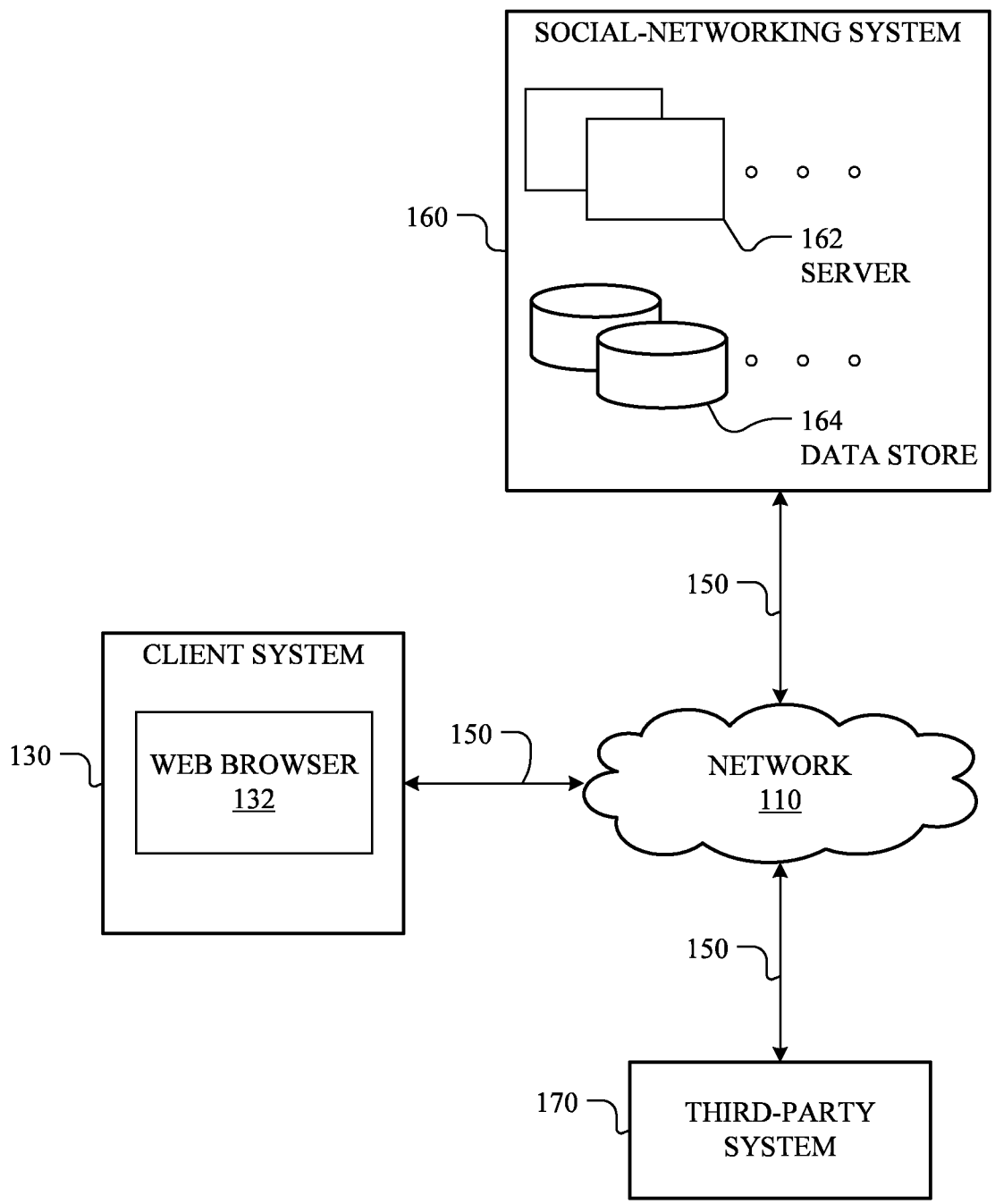
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
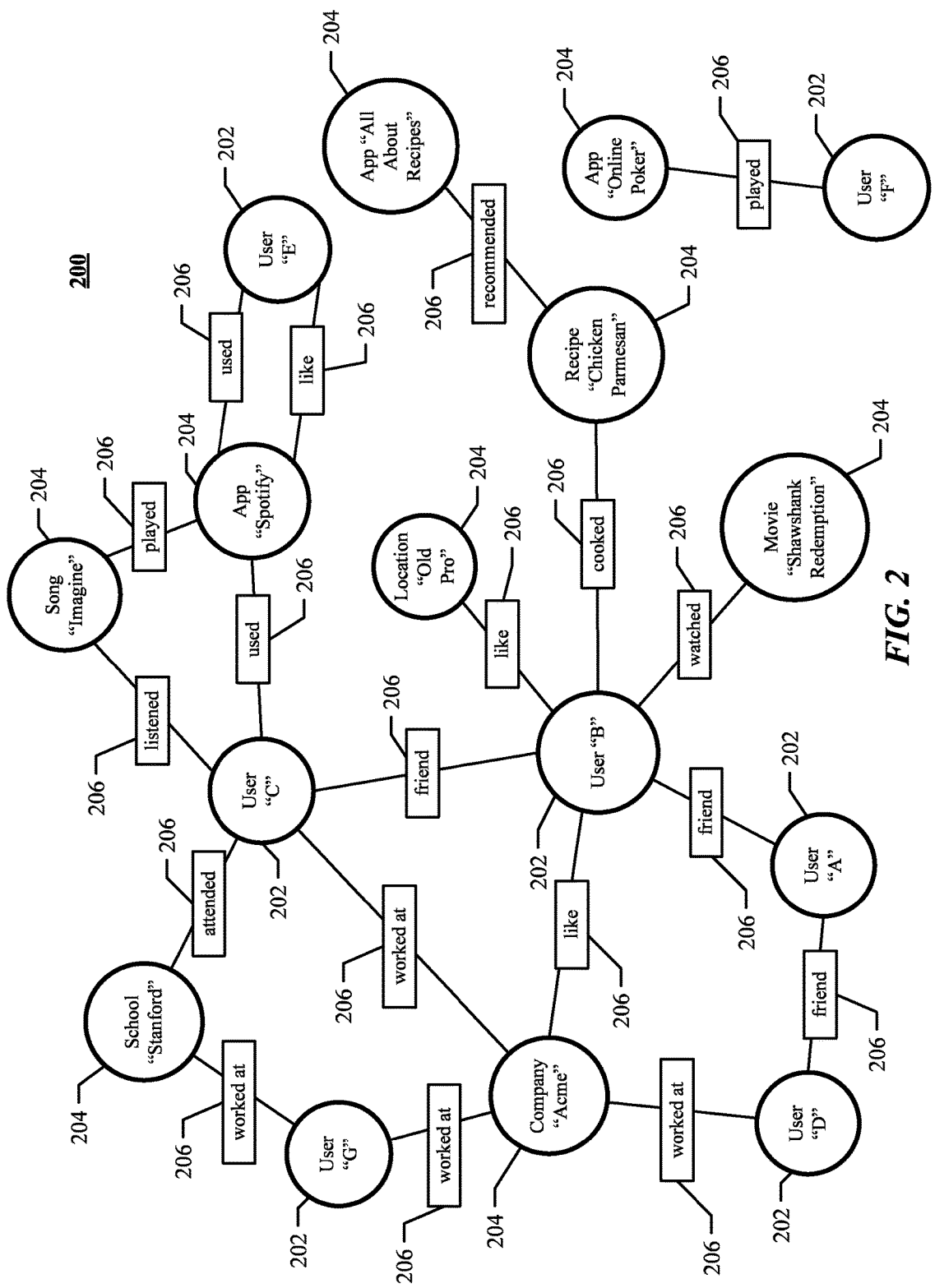
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2)

between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile Client System

Figure 3:
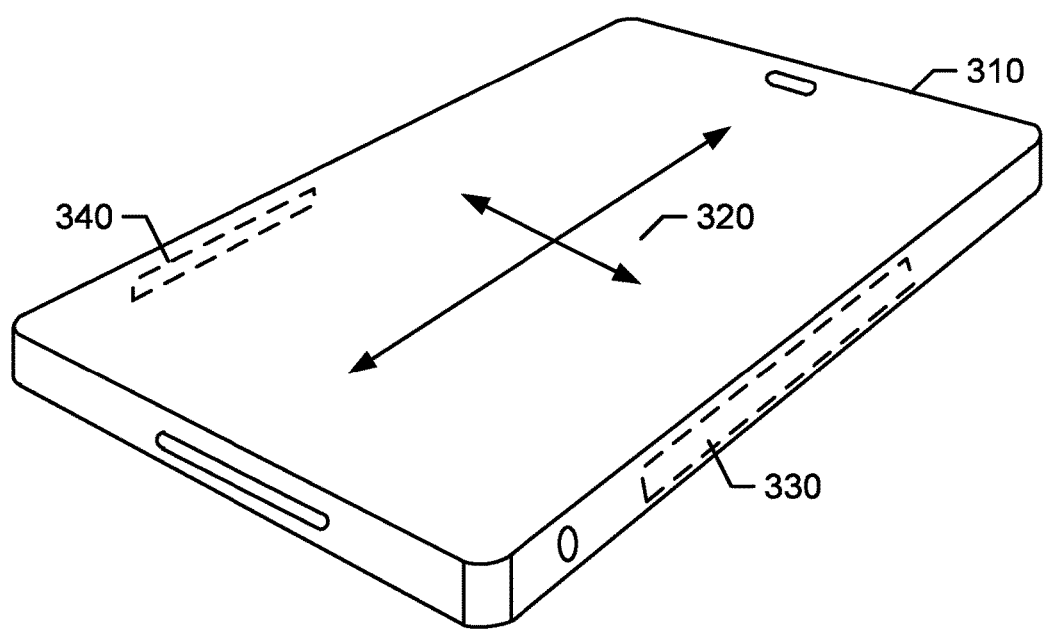
FIG. 3 illustrates an example mobile client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a display screen 310 and a touch sensor 320 as an input component.

In the example of FIG. 3, touch sensor 320 is incorporated on a front surface (e.g., display screen 310) of mobile client system 130. Touch sensor 320 may detect the presence and location of a touch (e.g., from a finger of a user) or the proximity of an object (e.g., a stylus). In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In particular embodiments, a user may be presented with a user interface ("UI") of one or more applications (e.g., mobile applications) on screen display 310 of mobile client system 130, and the user may interact with the UI of each of the applications via touch sensor 320.

In the example of FIG. 3, one or more antennae 330, 340 may be incorporated into one or more sides of mobile client system 130. Antennae 330, 340 are components that convert electric current into radio waves, and vice versa. During transmission of signals, a transmitter applies an oscillating radio frequency (RF) electric current to terminals of antenna 330, 340, and antenna 330, 340 radiates the energy of the applied the current as electromagnetic (EM) waves. During reception of signals, antennae 330, 340 convert the power of an incoming EM wave into a voltage at the terminals of antennae 330, 340. The voltage may be transmitted to a receiver for amplification.

In particular embodiments, mobile client system 130 many include a communication component coupled to antennae 330, 340 for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 330, 340 of mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a predetermined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

Deep Links

Application-to-application linking that works across various mobile platforms, and that allows for mobile "deep linking" from one application to a specific interface or view state (e.g., display state) within another application, rather than just opening up the content in a web browser, has the advantages of providing more flexibility and additional security for users of social-networking system 160. "Deep linking" is an application linking framework that allows for content in a first application (e.g., a mobile application) installed on a client device (e.g., client system 130) to directly link to a particular state (e.g., a particular interface, a particular piece of content, etc.) in a second application. In the context of the mobile applications, deep linking may consist of using a uniform resource identifier (URI) that links to a specific location within a mobile app (e.g., exampleApp://location/123456). As an example and not by way of limitation, the link fb://profile/33138223345 is an example of a mobile deep link with information for launching the Facebook mobile application ("fb://") to the profile of the page with identifier number 33138223345 ("profile/33138223345"), which is the Wikipedia page within the Facebook mobile application. When executing the instructions from the deep link received from the first application, a second application may be configured into a state specified by the instructions. Then, the state of the second application from execution of the instructions from the deep link may be presented to the user via a display of the client system 130. In particular embodiments, the deep link may include an application identifier (i.e., an "app ID") associated with the application (e.g., an app ID for a mobile travel app) and one or more instructions to configure the application to a specific state (e.g., instructions to configure the mobile travel app to a state that displays a list of hotels for a particular city).

In particular embodiments, deep links that include particular content may have different instructions based on the context of the deep link, where different contexts may result in differently configured states of the second application. In particular embodiments, a deep link may include metadata describing information associated with the user, the application, the client system 130, the operating system of the client system 130, any other suitable metadata, or any combination thereof. In particular embodiments, the information included in the deep link may act as an address to a particular access point specific to an application (e.g., similar to a URL), which allows one mobile application to cause another mobile application to open to a particular state corresponding to that particular access point.

In particular embodiments, a deep link may be associated with an input or with content presented by a first application. The deep link may include an application identifier of a second application and one or more instructions for the second application to perform an action based on information from the first application identified by the instructions. When the second application receives the instructions specified by the deep link from the application, the second application executes the instructions and is configured into a state specified by the instructions, which may then be presented to the user. As an example and not by way of limitation, a first application identifies a second application and a search query through a deep link associated with an input presented by the first application. When a user accesses the input, the search query is communicated from the first application to the second application, which performs a search across one or more sources based on the search query and subsequently presents the search results as the state of the second application. As such, the deep links may allow applications to leverage functionality of additional applications executing on a client system 130 to provide a user with additional information.

In addition to communicating instructions of the deep link from the first application that presented the content of the second application identified by the deep link, a reverse deep link describing a state of the first application when the content was presented can be communicated to the second application as well. Similar to the deep link, the reverse deep link includes one or more additional instructions and a second-application identifier that identifies the application from which the instructions were received as well as, optionally, content describing the state of the first application when the identified content was presented. The second application can present the reverse deep link and/or the content included in the reference deep link when presenting the state associated with the instructions included in the deep link.

In particular embodiments, when an indication of a user interaction with a deep link or a reverse deep link is received by the client system 130, the client system 130 may send analytic information describing the user interaction to an online system associated with the linked content. As an example and not by way of limitation, if a second application (e.g., a third-party application associated with a third-party system 170) that is not associated with the social-networking system 160 presents a reverse deep link including additional instructions describing a state of a first application associated with the social-networking system 160, the first application can send a payload to the second application including a tracking request. The tracking request may be a request to track information associated with the reverse deep link, such as information describing user actions (e.g., dwell times, date, time, and time period(s) of engagement with an application, etc.) on the second application that are associated with the reverse deep link, and other suitable and relevant information. The information of the tracking request is then communicated from the second application to the first (e.g., originating) application, and the client system 130 may send this analytic information describing the user interaction associated with the second application to the social-networking system. As an example and not by way of limitation, an advertisement for a product in a mobile social-networking application can include a deep link to a mobile marketplace application for purchasing the product, and the deep link can include a tracking request that asks the mobile marketplace application to ping back to the mobile-social networking application regarding whether the user made the purchase (e.g., the advertisement resulted in a conversion).

Analytic information of a deep link or a reverse deep link included in content can describe interaction statistics associated with the deep link, applications receiving the deep link or communicating the deep link, user profile information of a user to whom the deep link was presented, general social application usage data associated with a timestamp when the deep link was presented, other suitable information, or any combination thereof. This information can be used by owners of mobile applications and administrators of online social networks to track links between their applications and other applications, allowing them to gather more information about their applications in the mobile environment, including what applications are linking to their application, what application their applications are linking to, what users following these links are doing at the applications linked to, and other usage information from time of day application are used, time spent on an application, how often the application is used, and other relevant information. Although this disclosure describes the use of deep links and reverse deep links in a particular manner, this disclosure contemplates the use of deep links and reverse deep links in any suitable manner. The use of deep links and reverse deep links is further described in U.S. patent application Ser. No. 14/587,568, filed 31 Dec. 2014, which is incorporated by reference herein.

User Interfaces for Social Plug-ins

Figure 4A:
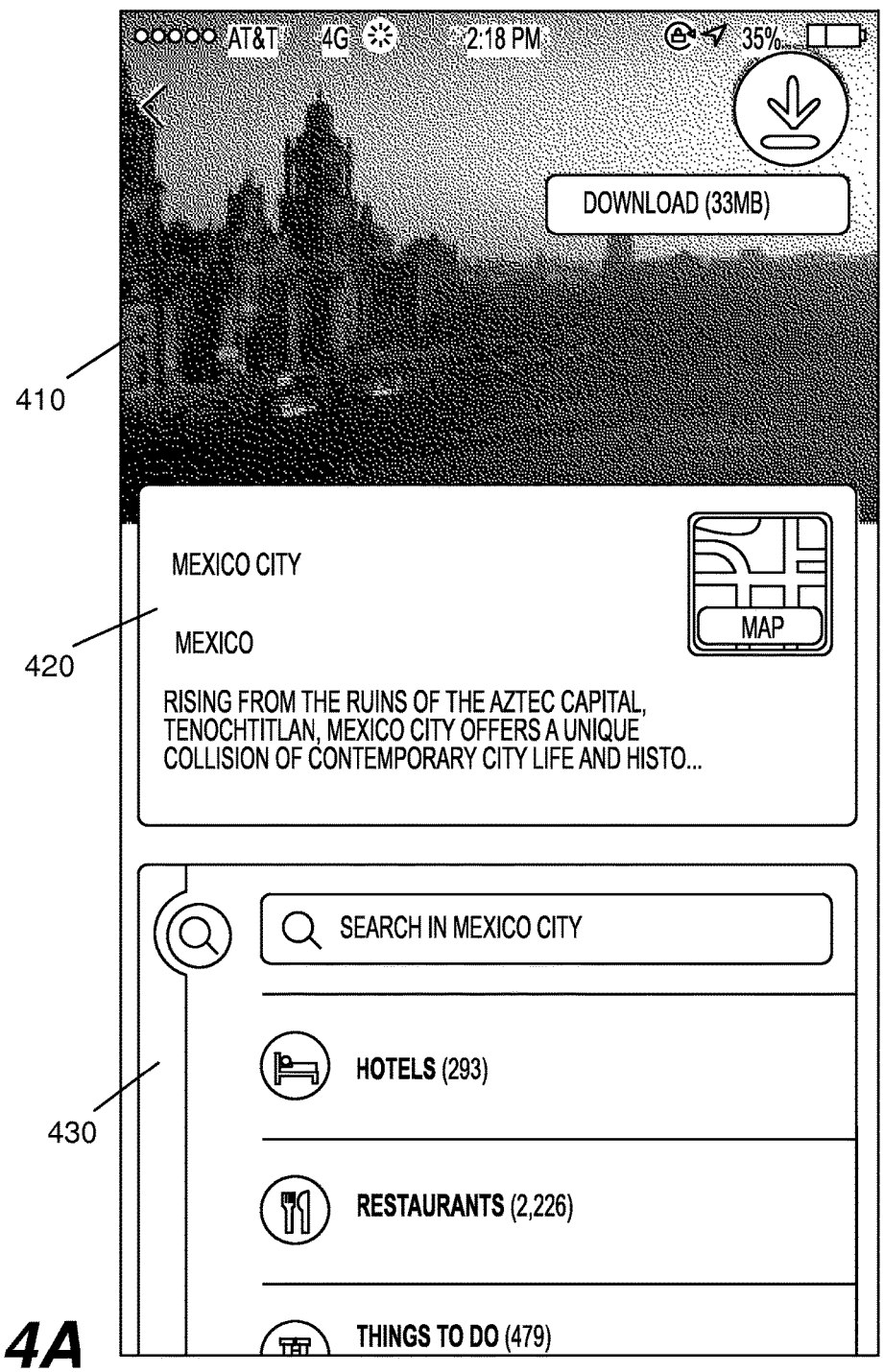
FIGS. 4A-4D illustrate example selection and display of interactive elements associated with a social-networking system according to an example embodiment.

In particular embodiments, content (e.g., first content) associated with an application (e.g., a first application) may be displayed on a user interface of a client system 130 of a user (e.g., a first user). The first application may be a third-party application that is not associated with the online social network. FIGS. 4A-4D illustrate example selection and display of interactive elements associated with a social-networking system 160 according to an example embodiment. FIG. 4A illustrates an example user interface 400 of an application 410 is displayed on client system 130. As an example and not by way of limitation, application 410 may be an application associated with social-networking system 160, or alternatively, a third-party application not associated with social-networking system 160. In the example of FIG. 4A, application 410 may be a third-party application that provides travel-related information and/or content.

In particular embodiments, the displayed content may be related to an entity associated with an online social network. As an example and not by way of limitation, the entity may correspond to a first node of a social graph 200 of the online social network. As discussed above, social graph 200 may include a plurality of nodes 202, 204 and a plurality of edges 206 connecting the nodes, and each of the edges between two of the nodes representing a single degree of separation between them. In addition, the displayed content may include one or more content objects associated with the first node corresponding to the entity. As shown in FIG. 4A, in response to a user search input of "Mexico City," application 410 may display content associated with Mexico City, Mexico, which corresponds to a concept node 204 of social graph 200 of the online social network. As an example and not by way of limitation, user interface 400 of application 410 may include one or more content objects associated with "Mexico City" such as an information section 420 that provides additional information on the search input (e.g., a summary of Mexico City) and a search section 430 that allows the user to search for relevant travel information associated with the search input (e.g., hotel information, restaurant information, information on things to do, etc. at Mexico City).

Figure 4B:
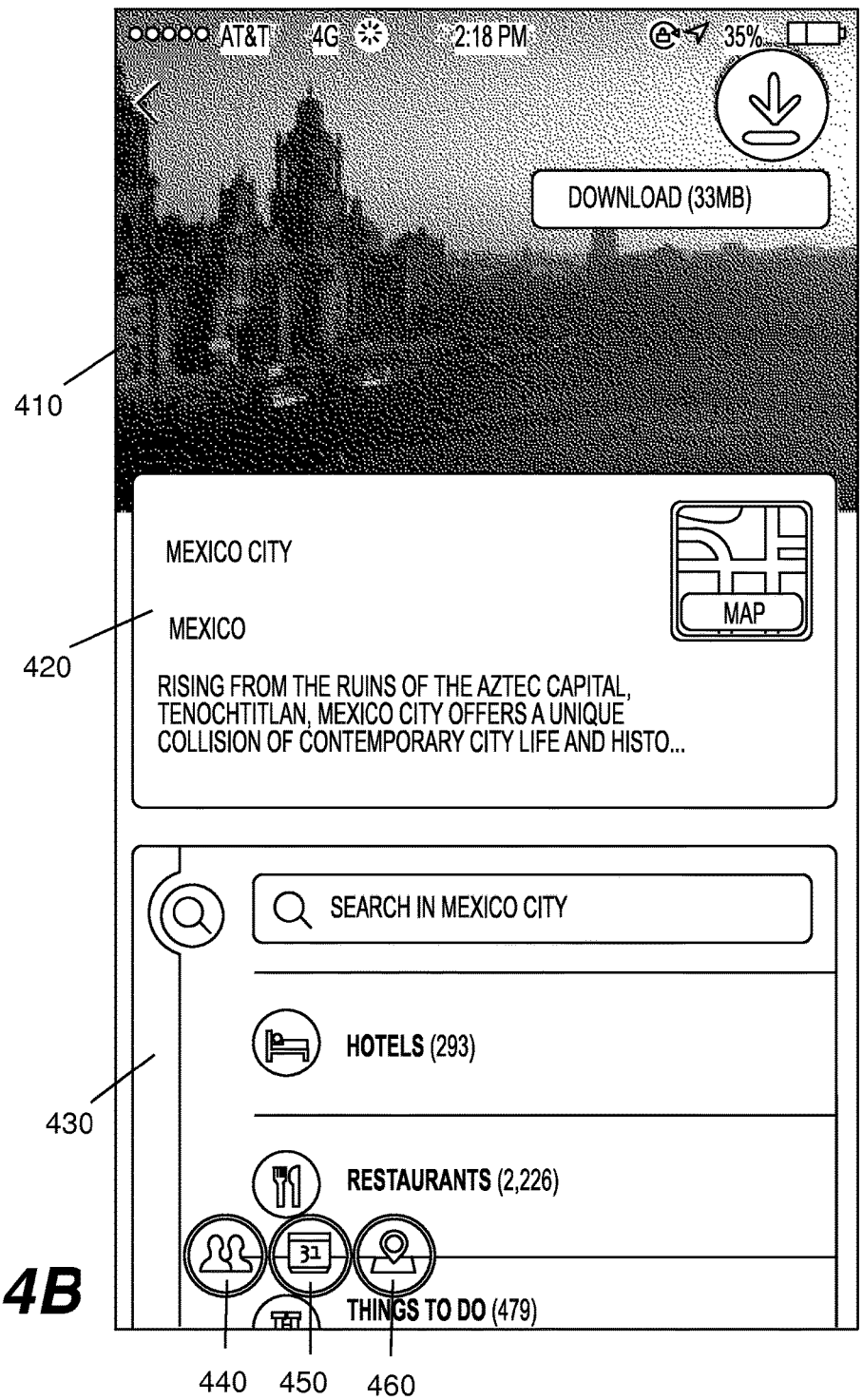

In particular embodiments, social-networking system 160 may present for display an interactive display element (e.g., a "bubble") associated with an application (e.g., a second application different from the first application) on screen 310 of mobile client system 130. The interactive display element may include one or more individual interactive elements. As an example and not by way of limitation, the second application may be an application associated with the online social network of social-networking system 160. As another example and not by way of limitation, the second application may be another third-party application different from the first third-party application. In the example of FIG. 4B, interactive elements 440, 450, 460 (e.g., which may grouped together as an "interactive element") are displayed on user interface 400 of application 410. As an example and not by way of limitation, client system 130 may automatically generate interactive elements 440, 450, 460 in response to instructions received from social-networking system 160. Social-networking system 160 may generate and provide instructions for automatic display of interactive elements 440, 450, 460 to client system 130 based on social-networking information of a user. Social-networking information may include, for example and not by way of limitation, demographic information (e.g., age, gender, nationality, race, ethnicity, and locality), biographic information (e.g., name, picture, birthday, and astrological sign), preferences (e.g., music, book, movie, and food preferences), payment credentials, purchase history, loyalty points or credits, allergies and other medical information, social-graph information (e.g., social connections within a threshold degree of separation in social graph 200 and social-networking information of those connections), conversation thread history between the user and one or more other users of an online social network, search history, any other information stored in a profile of the user on social-networking system 160, any other suitable information pertaining to the user, or any combination thereof. As an example and not by way of limitation, social-networking information may include a connection between a first node in social graph 200 corresponding to the user and a second node corresponding to a second user of the online social network or a concept. A connection (e.g., represented by an edge 206) between the first node and the second node may represent a particular social-networking action taken by the user with respect to the second user or content (e.g., the user has "liked" or checked-in at a page or event associated with the third-party content provider on an online social network). As another example and not by way of limitation, the social-networking information may include identifiers of one or more second users who are connected to the user in social graph 200 by a threshold degree of separation (e.g., first-degree connections may be "friends" of the first user). In particular embodiments, interactive elements 440, 450, 460 may correspond to any node in social graph 200 and may be generated automatically or manually using any suitable technique. Although interactive elements are described in a particular manner herein, interactive elements may correspond to any suitable content object.

In particular embodiments, client system 130 may cause one or more of interactive elements 440, 450, 460 to gradually appear (e.g., fade in), pop up immediately, automatically slide from a first position to a second position different form the first position on user interface 400, appear to be dragged via a user input on user interface 400 (e.g., follow path of a user input from a first position to a second position), or appear in any other suitable manner. Interactive elements 440, 450, 460 may be displayed to the user within a pre-determined amount of time after client system 130 receives the instructions from social-networking system 160 (e.g., within ten minutes, five minutes, one minute, thirty seconds, ten seconds, or in real-time), and this pre-determined amount of time may, for example, depend on the content object to which the interactive elements 440, 450, 460 corresponds (e.g., the type or composer of content object) or a status of the client system 130 (e.g., online or in sleep mode). In particular embodiments, interactive elements 440, 450, 460 may be displayed in response to the activation by mobile client system 130 of a social plug-in associated with the third-party application (e.g., a social plug-in for use on mobile devices such as mobile client system 130). Generally, a plug-in is a software component that adds a specific feature to an existing software application, in which the addition of the plug-in enables customization of features associated with the software application. As an example and not by way of limitation, a social plug-in may be configured to add social-networking features (e.g., the display of social-networking information) associated with social-networking system 160 to a third-party application, and this social plug-in may be used with a variety of different systems (e.g., mobile client system 130) and different applications. In particular embodiments, the social plug-in may be activated while a user is interacting with a third-party application, causing the social plug-in to generate one or more interactive elements to be displayed on a user interface of the third-party application, as discussed below. Although the activation and display of interactive elements is described in a particular manner herein, interactive elements may be activated and displayed in any suitable manner.

In particular embodiments, each of interactive elements 440, 450, 460 may display particular content (e.g., social networking content, third-party content, etc.) when activated (e.g., when the user selects the interactive element and opens an interactive element window, as described below). As shown in FIG. 4B, to visually indicate the particular content associated with each interactive element, each of interactive elements 440, 450, 460 (i.e., the interface of the interactive element itself) may include an image, text, any other suitable identifier of the selected content object, or any combination thereof. In particular embodiments, the interface of the interactive element may be a bubble, icon, or other suitable element with which the user may interact (e.g., move or select). As an example and not by way of limitation, interactive element 440 is shown as an image of the silhouette of two people, and may correspond to user information associated with social-networking system 160; interactive element 450 is shown as an image of a day planner/calendar, and may correspond to calendar information associated with social-networking system 160; and interactive element 460 is shown as an image of an arrow over a location on a white page representative of a map, and may correspond to location information associated with social-networking system 160. In particular embodiments, the image interface of each of interactive elements 440, 450, 460 may be resized, modified, distorted, or otherwise altered. In addition, interactive element 440, 450, 460 may each include an image, name, identifier, moniker, or any other suitable identifying information or other identifier of the content associated with social-networking system 160. Although interactive elements are described in a particular manner herein, interactive elements may be represented in any suitable manner and generated using any suitable method or technique.

In particular embodiments, mobile client system 130 may generate and display one or more interactive elements without leaving the context (e.g., user interface 400 of application 410) in which the user is browsing (i.e., without changing the application state). In addition, the one or more interactive elements may be persistently displayed on user interface 400 until mobile client system 130 receives a user input (e.g., a user input associated with one or more of interactive elements 440, 450, 460). As an example and not by way of limitation, an interactive element may be displayed until client system 130 either receives user input selecting one or more of interactive elements 440, 450, 460 or user input dismissing one or more of interactive elements 440, 450, 460. In particular embodiments, an interactive element is persistently displayed to overlap at least a portion of a user interface of the background application (e.g., the first application). As an example and not by way of limitation, interactive elements 440, 450, 460 may be displayed to overlap at least a portion of user interface 400. As an example and not by way of limitation, interactive elements 440, 450, 460 may persist in the portion of display screen 310 of mobile client system 130 (e.g., a corner of user interface 400) until removed from persisting (e.g., by dragging off the screen). As another example and not by way of limitation, interactive elements 440, 450, 460 are displayed on a first hierarchical layer that overlays a portion of a second hierarchical layer of application 410. In particular embodiments, an interactive element is movable from a first location to a second location different from the first location on the user interface of client system 130. As an example and not by way of limitation, the user may manually position one or more of interactive element 440, 450, 460 by, for example, dragging to a location on display screen 310 of client system 130. Interactive elements 440, 450, 460 may persist in interface 400 of application 410 running on client system 130 or in any other interface or context display on mobile client system 130. Client system 130 may automatically position one or more of interactive elements 440, 450, 460 to avoid occluding content or icons (e.g., jewel icons). Mobile client system 130 may automatically position interactive elements 440, 450, 460 to cover marginal or fringe areas of certain types of content (e.g., photographs) in interface 300. In the illustrated example of FIG. 4B, interactive elements 440, 450, 460 are positioned at the edge of user interface 400, covering a marginal region of search section 430.

In particular embodiments, interactive elements 440, 450, 460 may function and be displayed independent of activity of an application running on client system 130. In the example of FIG. 4B, the display of interactive element 320 does not interfere with the activity of the underlying application presented via user interface 400, and the user may interact normally with user interface 400. As an example and not by way of limitation, the user may scroll through one or more content objects associated with "Mexico City", interact with any of the one or more content objects, interact with information section 420 (e.g., by clicking on section 420) to view more information, interact with search section 430 (e.g., by entering a search query into the search element), or interact with application 410 using user interface 400 in any other suitable way. As an example and not by way of limitation, application 410 may continue to operate without interruption if one or more of interactive elements 440, 450, 460 are dismissed by the user.

In particular embodiments, when there is a plurality of interactive elements, the interactive elements may be displayed to be located adjacent to each other. In addition, multiple interactive elements may be displayed to "stack" one on top of another. In particular embodiments, when multiple interactive elements form a stack, by tapping the top interactive element of the stack, the user may trigger a fan-out view of all the different interactive elements. Alternatively, depending on the size of display screen 310 in which application 410 is displayed, multiple interactive elements may not stack and may instead be individually displayed (e.g., in a side bar area of user interface 400 or in any other suitable region of user interface 400). In particular embodiments, one or more interactive elements may be displayed in a landing view/drawer element, which may be opened by, for example, swiping up from the bottom of display screen 310. As an example and not by way of limitation, the landing view may include any number of interactive elements each associated with unique third-party applications and/or applications associated with social-networking system 160, and a user may drag one or more of these interactive elements to a location on user interface 400, where each of these interactive elements may persist individually. As another example and not by way of limitation, multiple expanded stacks of interactive elements may be displayed on user interface 400, including, for example, a first expanded stack of interactive elements displaying content on a top portion of user interface 400 and a second expanded stack of interactive elements displaying content on a bottom portion of user interface 400. Alternatively, only a single expanded stack of interactive elements may be displayed at once on the screen to maximize the amount of application content of application 410 displayed on interface 400 while minimizing occluding of content.

In particular embodiments, client system 130 may receive a particular user input that may cause interactive elements 440, 450, 460 or a stack of interactive elements, to be repositioned (i.e., moved) for continued display in user interface 400 of client system 130. As an example and not by way of limitation, user input selecting (e.g., pressing) and dragging one or more of interactive elements 440, 450, 460 or a stack of interactive elements to a desired location on user interface 400 of client system 130 may cause client system 130 to reposition interactive elements 440, 450, 460 or the stack of interactive elements according to the user input. Although interactive elements are described in a particular manner herein, interactive elements may be represented and/or displayed in any suitable manner and generated, moved, or removed using any suitable method or technique. In addition, interactive elements, and the display and/or behavior of interactive elements, are described in further detail in U.S. patent application Ser. No. 13/685,431, filed 26 Nov. 2012; U.S. application Ser. No. 14/099,561, filed 6 Dec. 2013; and U.S. patent application Ser. No. 14/594,437, filed 12 Jan. 2015, which are incorporated by reference herein.

In particular embodiments, social-networking system 160 may access, upon receiving the user input (e.g., the first user input) selecting one or more interactive elements (e.g., one or more first interactive elements), a deep-link index of the online social network to retrieve a deep link to the second application indexed with the entity. As discussed in more detail below, a deep-link index may include one or more deep links, and each deep link may include an application identifier (e.g., an "app ID") associated with an application and one or more instructions to configure the application to a specific state (e.g., a state of displaying particular information). In particular embodiments, the deep link to an application may include instructions for accessing a display state of the application, where the application may be associated with an entity (e.g., "Mexico City") that corresponds to a first node of social graph 200 of the online social network (discussed above). In particular embodiments, the deep-link index may be accessed via a social plug-in associated with the online social network to retrieve the deep link to the application (e.g., the second application), and the retrieved deep link may be executed via the social plug-in to present the display state of the application.

As an example and not by way of limitation, a user may be interacting with a first application associated with social-networking system 160, and, in particular, may be interacting with content on the first application associated with Mexico City (e.g., viewing a posting discussing Mexico City, viewing pictures showing a location in Mexico City, viewing an article discussing Mexico City, etc.). The user may then decide that he wants to view travel information for Mexico City, and selects an interactive element corresponding to a second application that provides travel information (e.g., hotel information, flight information, point-of-interest information, etc.). Upon this selection, social-networking system 160 may, via a social plug-in associated with social-networking system 160, access a deep-link index of the online social network to retrieve a deep link to the second application (e.g., a third-party travel application) that includes instructions for accessing a display state associated with Mexico City in the second application (e.g., a display state that includes hotel information, flight information, point-of-interest information, etc. associated with Mexico City). This allows for the first application associated with social-networking system 160 to be able to provide relevant information by directly displaying a display state of a second application (i.e., a third-party application) associated with particular entities relevant to the specific content the user is viewing and/or interacting with. In addition, this allows for applications to communicate with each other about specific social-networking entities by searching a universal index of deep links associated with third-party applications generated and maintained by social-networking system 160 (e.g., based on searching entity identifiers and via the social plug-in).

As another example and not by way of limitation, a user may be interacting with a first application (e.g., a third-party travel application), and in particular, may be interacting with content on the first application associated with Mexico City (e.g., view flights, hotels, points-of-interest, etc.). The user may then decide that he wants to view social-networking information relating Mexico City (e.g., posts of friends of the user that have visited Mexico City, pictures posted by friends who have visited Mexico City, check-ins at particular points-of-interest posted by friends who have visited Mexico City, etc.), and selects an interactive element corresponding to a second application associated with social-networking system 160 that can provide this information. Upon this selection, social-networking system 160 may, via a social plug-in associated with social-networking system 160, access a deep-link index of the online social network to retrieve a deep link associated with the entity of Mexico City and includes instructions for accessing a display state of relevant content associated with Mexico City on the second application associated with social-networking system 160 (e.g., a display state that includes social-networking content associated with Mexico City, such as posts of friends of the user that have visited Mexico City, pictures posted by friends who have visited Mexico City, check-ins at particular points-of-interest posted by friends who have visited Mexico City, etc.). This allows for the second application associated with social-networking system 160 to be able to provide social-networking content relevant to the specific content the user is viewing and/or interacting with (e.g., travel information for Mexico City) in the first application (i.e., the third-party application) by directly displaying this content via the social plug-in within the first application (as discussed below) without requiring the user to separately access an application associated with social-networking system 160 and separately searching for this content. The building of this deep-link index, in addition to the searching of this deep-link index, is described in more detail below.

In particular embodiments, the social plug-in may be configured to display social-networking content passed directly to the social plug-in (e.g., responsive to the activation of an interactive element) without being processed or stored on the third-party application. As an example and not by way of limitation, the social-networking content may bypass the third-party application when being displayed via the social plug-in such that this social-networking content is not accessible by the third-application. Similarly, the social plug-in and interactive notification elements may be used to display third-party content within an application associated with social-networking system 160, in addition to displaying third-party content in another third-party application, with the social plug-in acting as an intermediary to access and present the content associated with the second third-party application within the first third-party application or the application associated with social-networking system 160. In addition, prior to accessing the deep-link index via the social plug-in, social-networking system 160 may request authentication information from the client system 130 to access the second application. As an example and not by way of limitation, social-networking system 160 may request user authentication information (e.g., user login information) associated with accessing the online social network from the client system 130 to access the second application (e.g., an application associated with social-networking system 160). In particular embodiments, the authentication information may be sent via the social plug-in and not accessible by the first application (e.g., sent without being processed or stored on the third-party application). Although this disclosure describes accessing and using plug-ins in a particular manner, this disclosure contemplates accessing and using plug-ins in any suitable manner.

Figure 4C:
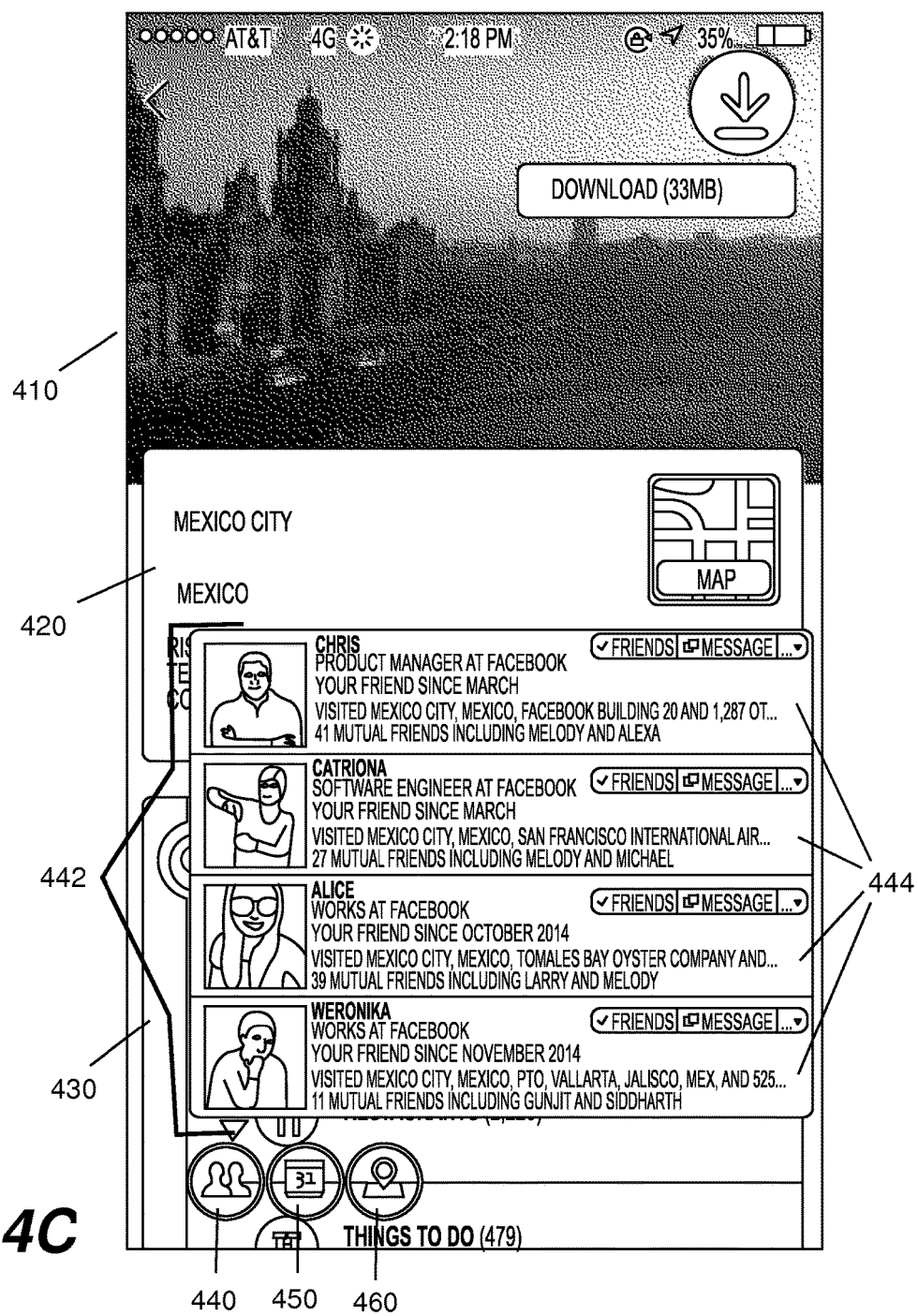
Figure 4D:
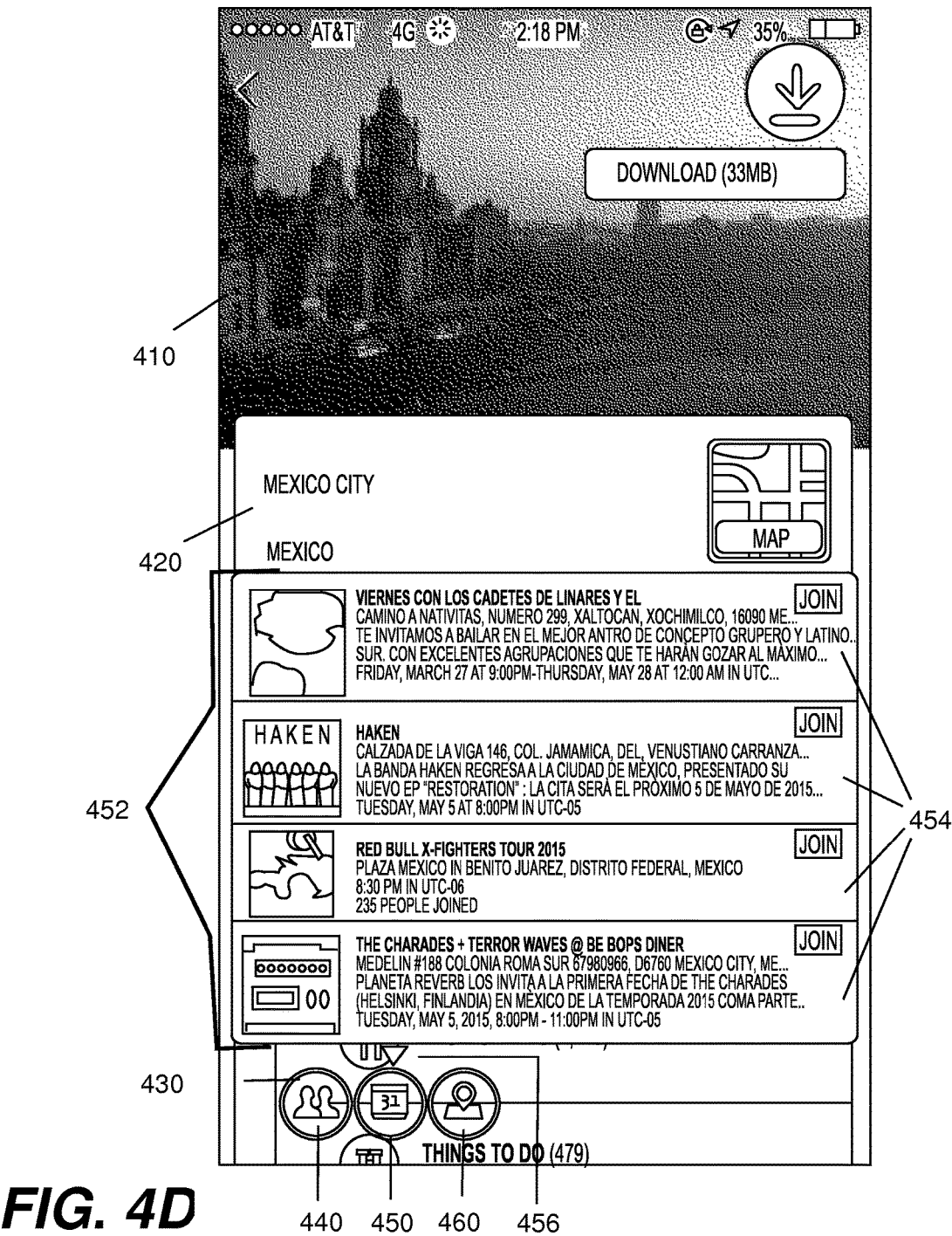

In particular embodiments, social-networking system 160 may execute, at the client system 130 of the first user, the retrieved deep link to present the display state of the application (e.g., the second application associated with social-networking system 160) associated with the entity. The display state may be presented for persistent display on a second interactive element different from the first interactive element (e.g., in a search-results window overlaying the display state of the second application). In addition, the display state may include at least second content related to the entity, the second content being different from the first content. As shown in FIG. 4C, when interactive element 440 is selected, an interactive element interface 442 (e.g., a second interactive element) corresponding to the type of information associated with interactive element 440 is opened and displayed as a separate window on user interface 400 of application 410, with an arrow 446 between interactive element interface 442 and interactive element 440 to indicate the relationship. Similarly, as shown in FIG. 4D, when interactive element 450 is selected, an interactive element interface 452 corresponding to the type of information associated with interactive element 450 is opened and displayed as a separate window on user interface 400 of application 410, with an arrow 456 between interactive element interface 452 and interactive element 450 to indicate the relationship. In particular, mobile client system 130 may cause interactive element interface 442 to be displayed in response to a user input selecting (e.g., tapping) interactive element 440, and interactive element interface 452 to be displayed in response to a user input selecting interactive element 450. Interactive element interface 442, 452 may be displayed without leaving the context of application 410 in which the user is browsing or with which the user is interacting. In particular embodiments, interactive element interface 442, 452 may be displayed to overlap a portion of application 410. Although this disclosure describes executing deep links in a particular manner, this disclosure contemplates executing deep links in any suitable manner.

In particular embodiments, the presenting of the second interactive element (e.g., the search-results window) may include opening an interactive-element interface enabling the first user to interact with the one or more content objects of the second content (e.g., the searched-for results, including social-networking content and/or third-party content) by a second user input. As discussed above, the second content may be passed directly to the second interactive element via the social plug-in without being processed or stored by the background application. As an example and not by way of limitation, the second content may include content associated with social-networking system 160. As another example and not by way of limitation, the second content may include content associated with a third-party application. As shown in FIG. 4C, interactive element interface 442 may display one or more content items 444. Similarly, as shown in FIG. 4D, interactive element interface 452 may display one or more content items 454. Interactive element interface 442, 452 may float on top of the user interface of application 410. The user may interact with one of more of content items 444, 454 without leaving the context of application 410. In particular embodiments, the second content may include one or more content objects each associated with a respective second node in the social graph that is connected to the first node by one or more edges. As an example and not by way of limitation, interactive element 440 may correspond to user information associated with social-networking system 160, and one or more content items 444 displayed in interactive element interface 442 may include one or more social-networking information associated with the entity (e.g., a list of users associated with second nodes of the online social network that are connected to the entity of Mexico City by one or more edges, which may include having visited Mexico City, posting comments on Mexico City, check-in at particular points-of-interest in Mexico City, etc.). As another example and not by way of limitation, interactive element 450 may correspond to calendar information associated with social-networking system 160, and one or more content items 454 displayed in interactive element interface 452 may include one or more social-networking information associated with the entity (e.g., a list of calendar events associated with second nodes of the online social network that are connected to the entity of Mexico City by one or more edges, which may include various events scheduled to be performed at a location in Mexico City). In particular embodiments, the second content may be dynamically updated in real time to as to provide updated content associated with either social-networking system 160, a third-party application, a combination of both, or any other relevant content. As an example and not by way of limitation, an interactive display element corresponding to a sports application may include information about a particular sporting event, such as a running game timer, current score, current period of play, as well as any other relevant game status information.

In particular embodiments, the second interactive element is persistently displayed to overlap at least a portion of the user interface of the first application. As an example and not by way of limitation, interactive element interface 442 may be provided for persistent display independent of and without altering the activity of application 410. As another example and not by way of limitation, interactive element interface 442 may be a call-out box, pop-up window, drop-down menu, bubble, other suitable user interface, or any combination thereof. In particular embodiments, the second interactive element is movable from a first location to a second location on the user interface of the client system 130. As an example and not by way of limitation, interactive element interface 442 may be movable to a different locations on user interface 400. The movement of interactive element 442 may be coupled to the movement of interactive element 440 such that they are moved together, and the size and position of interactive element interface 442 may change depending on the new location. In particular embodiments, the second interactive element comprises one or more third interactive elements for toggling between the second interactive element and the user interface of the first application. As an example and not by way of limitation, the user may close, collapse, or otherwise cause interactive element interface 350 to disappear by selecting or otherwise tapping interactive element 440, by selecting outside interactive element interface 442, by selecting a particular exit button, by any other suitable user inputs, or any combination thereof. Although this disclosure describes the interface and interaction with interactive elements in a particular manner, this disclosure contemplates the interface and interaction with interactive elements in any suitable manner.

In particular embodiments, the one or more content objects of the second content (e.g., the content retrieved from another application with the executed deep link) may be ranked based on a predetermined metric, and the one or more search results may be presented in ranked order based on their respective rankings. As an example and not by way of limitation, the one or more content objects may be ranked based on a social-graph affinity between the first content and the second content. As shown in FIG. 4C, content items 444 including a plurality of users of the online social network (e.g., corresponding to second nodes) that are connected to Mexico City (e.g., corresponding to a first node) by one or more edges (e.g., users that have visited Mexico City). Content items 444 may be ranked based on social-graph affinity between the first content (e.g., Mexico City) and the second content (the users that have visited Mexico City) such as, for example, a number of visits, the duration of the visit(s), the amount of social-networking content the user pasted associated with his/her visit, other suitable metrics, or any combination thereof. Content items 444 may also be ranked based on information associated with the user viewing and/or interacting with application 410, such as the relationship and degree of separation between the users that have visited Mexico City and the user viewing the first content, other suitable metrics, or any combination thereof. As another example and not by way of limitation, the one or more content objects may be ranked based on a type of the content object (e.g., a list of users, a list of user posts, user-posted pictures, etc.) of the second content. In addition, for example, the one or more content objects may be ranked based on predetermined parameters such as the prominence and/or popularity of an event, the number of users who have commented and/or posted content associated with an event, the proximity of the event to a current calendar date, other suitable metrics, or any combination thereof. Content items 454 may also be ranked based on information associated with the user viewing and/or interacting with application 410, such as ranking events based on the interests of the user, the history of other events the user has attended and/or posted content on, and other suitable metrics. Although this disclosure describes the ranking of content objects in a particular manner, this disclosure contemplates the ranking of content objects in any suitable manner.

Figure 5A:
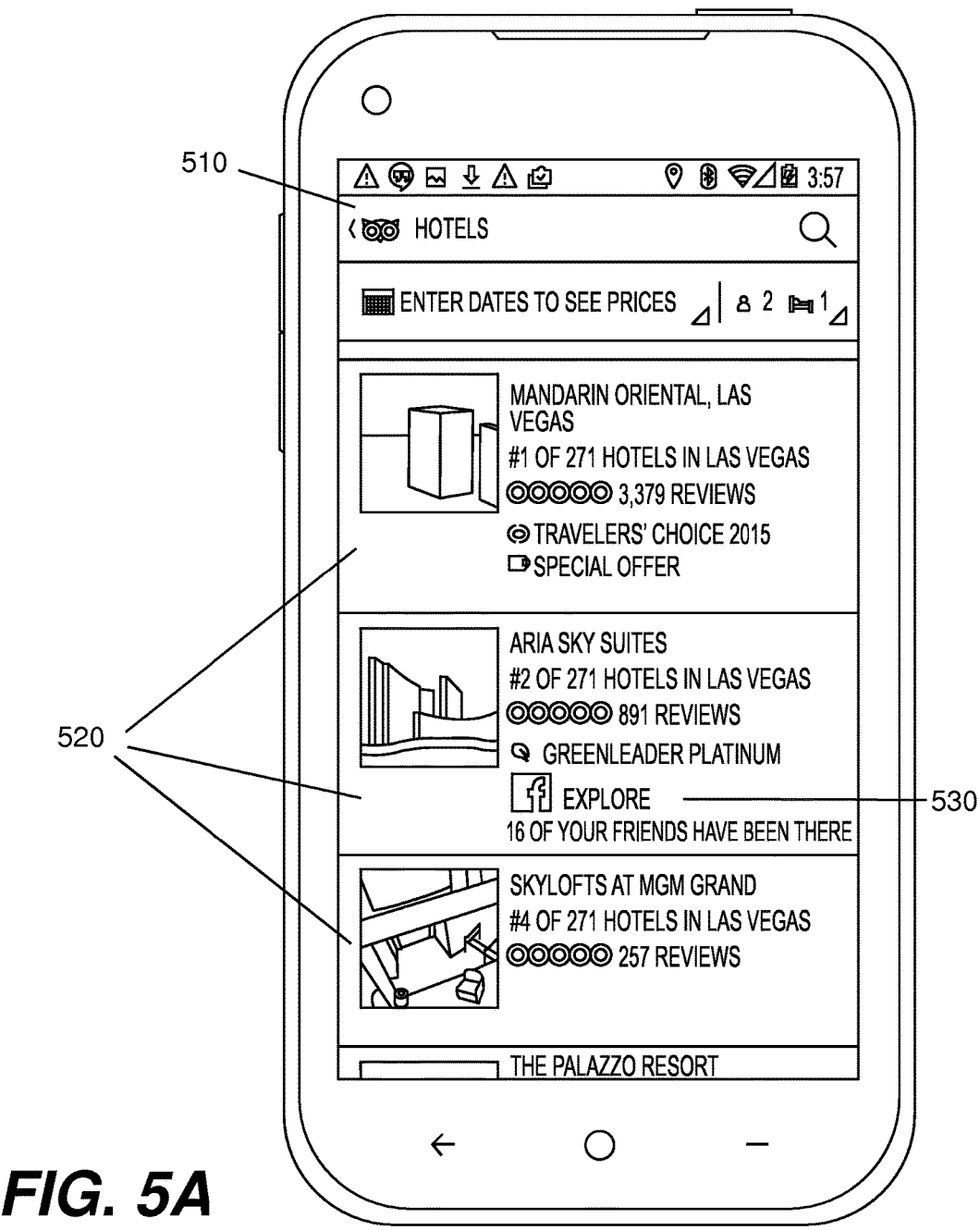
FIGS. 5A-5D illustrate example selection and display of interactive elements associated with a social-networking system according to another example embodiment.

FIGS. 5A-8B illustrate a user interface for displaying social-networking content within a third-party application according to an example embodiment. In the example of FIG. 5A, user interface 500 of application 510 is displayed on client system 130. An example and not by way of limitation, application 510 may be a third-party application unrelated to social-networking system 160. as another example and not by way of limitation, application 510 may be an application relating to travel information and/or content (e.g., TripAdvisor®, Travelocity®, Expedia®, etc.). In response to a user search of hotels in Las Vegas, Nev., user interface 500 includes information on three different content items 520, each content item 520 corresponding to a particular hotel in Las Vegas. In particular embodiments, content displayed on user interface 500 may correspond to an entity associated with an online social network of social-networking system 160. As an example and not by way of limitation, the user search input of "Las Vegas" may correspond to a node (e.g., a concept node 204) on social graph 200 of the online social network. As discussed above, social graph 200 may include a plurality of nodes and a plurality of edges connecting the nodes. Users of social networking system 160 (e.g., users A, B, C, D, E, F, G 202 shows in FIG. 2) may each correspond to nodes (e.g., user nodes 202) on social graph 200 of the online social network.

Figure 5B:
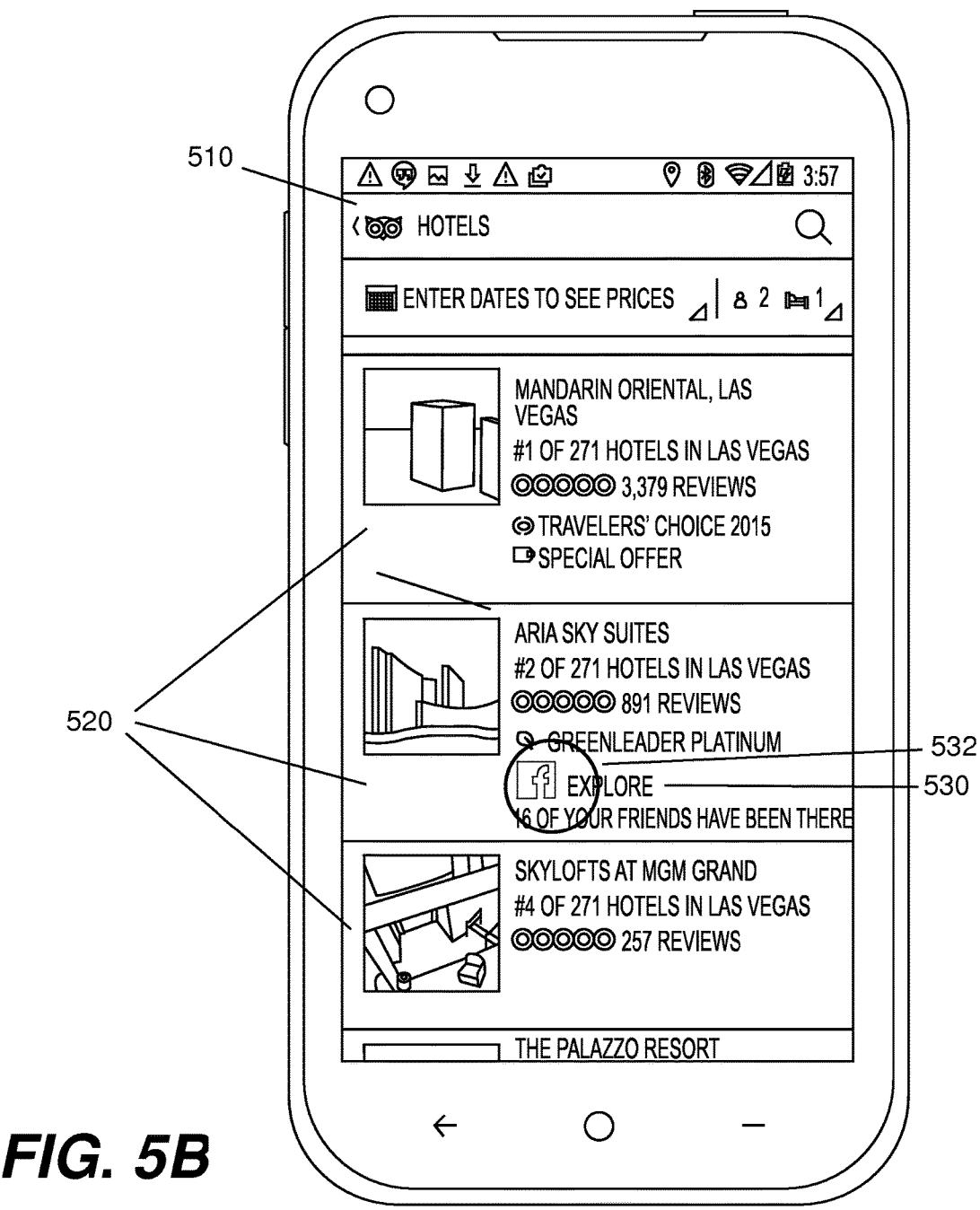
Figure 5C:
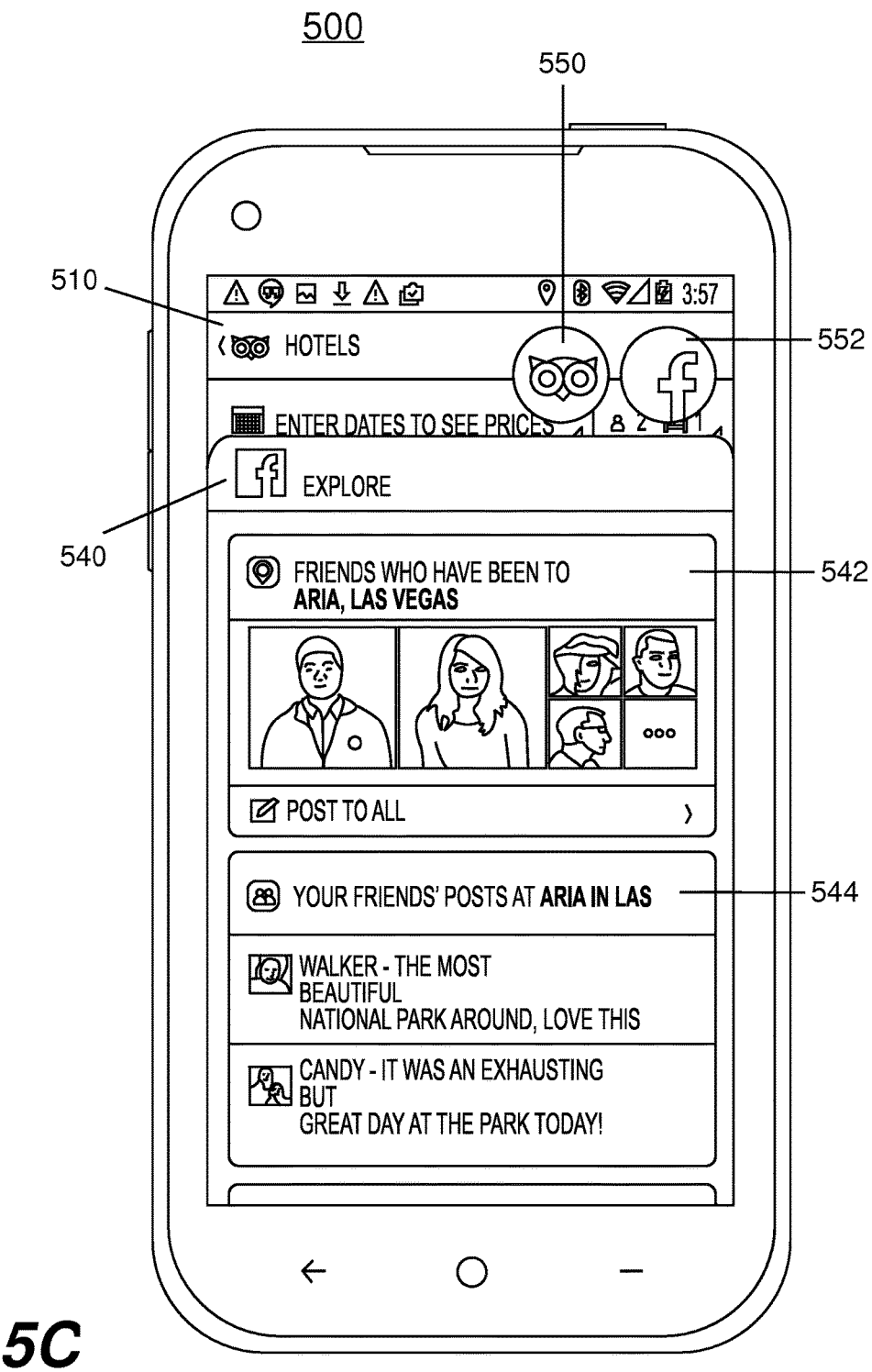

In particular embodiments, social-networking system 160 may present for display an interactive element 530 (e.g., a first interactive element) as part of one or more of content items 520. As an example and not by way of limitation, interactive element 530 ("Explore") may be included as part of content item 530 corresponding to Aria Sky Suites Hotel in Las Vegas, Nev. Interactive element 530 may also include social-networking information, such as social-networking information associated with the user interacting with application 510. As an example and not by way of reference, interactive element 530 may include information on the number of friends of the user associated with content item 520 (e.g., the number of friends of the user that have been to Aria Sky Suites Hotel in Las Vegas). As shown in FIG. 5B, a user may select interactive element 530, for example, by pressing and/or tapping a location 532 of interactive element 530. Then, as shown in FIG. 5C, in response to the selection of interactive element 530, an interactive element interface 540 (e.g., a second interactive element different from the first interactive element) corresponding to the type of information associated with interactive element 530 is opened and displayed as a separate window on user interface 500 of application 510. Interactive element interface 540 may display social-networking information associated with content item 520.

Figure 5D:
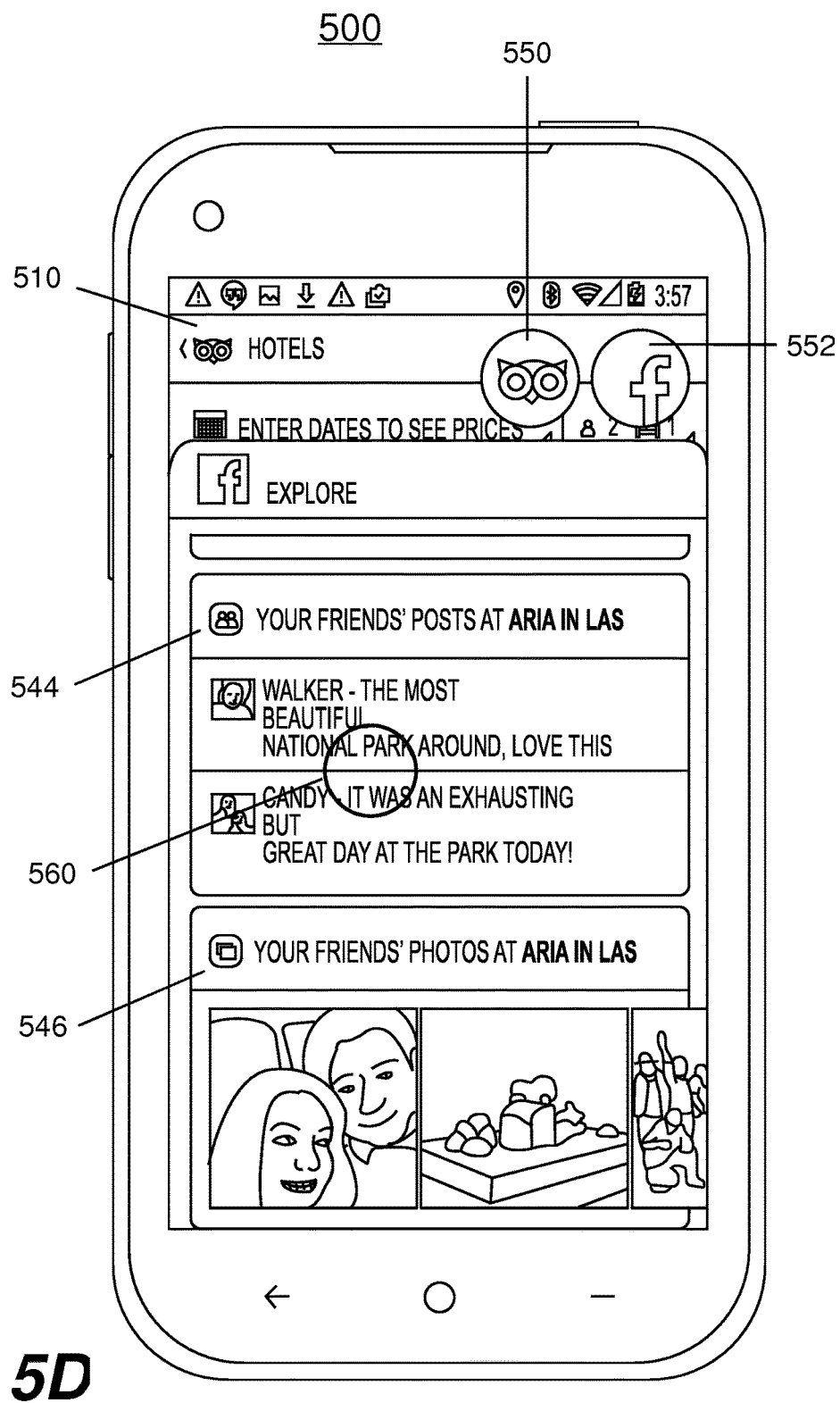

In particular embodiments, interactive element interface 540 may include one or more content sections 542, 544, 546 which provide additional social-graph information on the friends of the user associated with content item 520. As an example and not by way of limitation, as shown in FIGS. 5C and 5D, first content section 542 may include a list of friends of the user who have visited Aria Sky Suites Hotel in Las Vegas, second content section 544 may include a list of posts from friends of the user at Aria Sky Suites Hotel in Las Vegas, and third content section 546 may include one or more photographs posted by friends of the user at Aria Sky Suites Hotel in Las Vegas. The presentation of the social-graph information may depend on the type of content displayed. As an example and not by way of limitation, the list of friends of first content section 542 may be displayed as a plurality of profile pictures retrieved from the online social network and each corresponding to a friend in the list, the list of posts of second content section 544 may be displayed as a list of posts next to a profile picture of the user who posted the comments, and the plurality of photographs of third content section 546 may be displayed as a scrollable bar and/or section of photographs. In addition, the user may interact with user interface 500 via a scrolling input 560 to move between the different content sections that cannot all fit onto user interface 500 at one time.

Figure 8A:
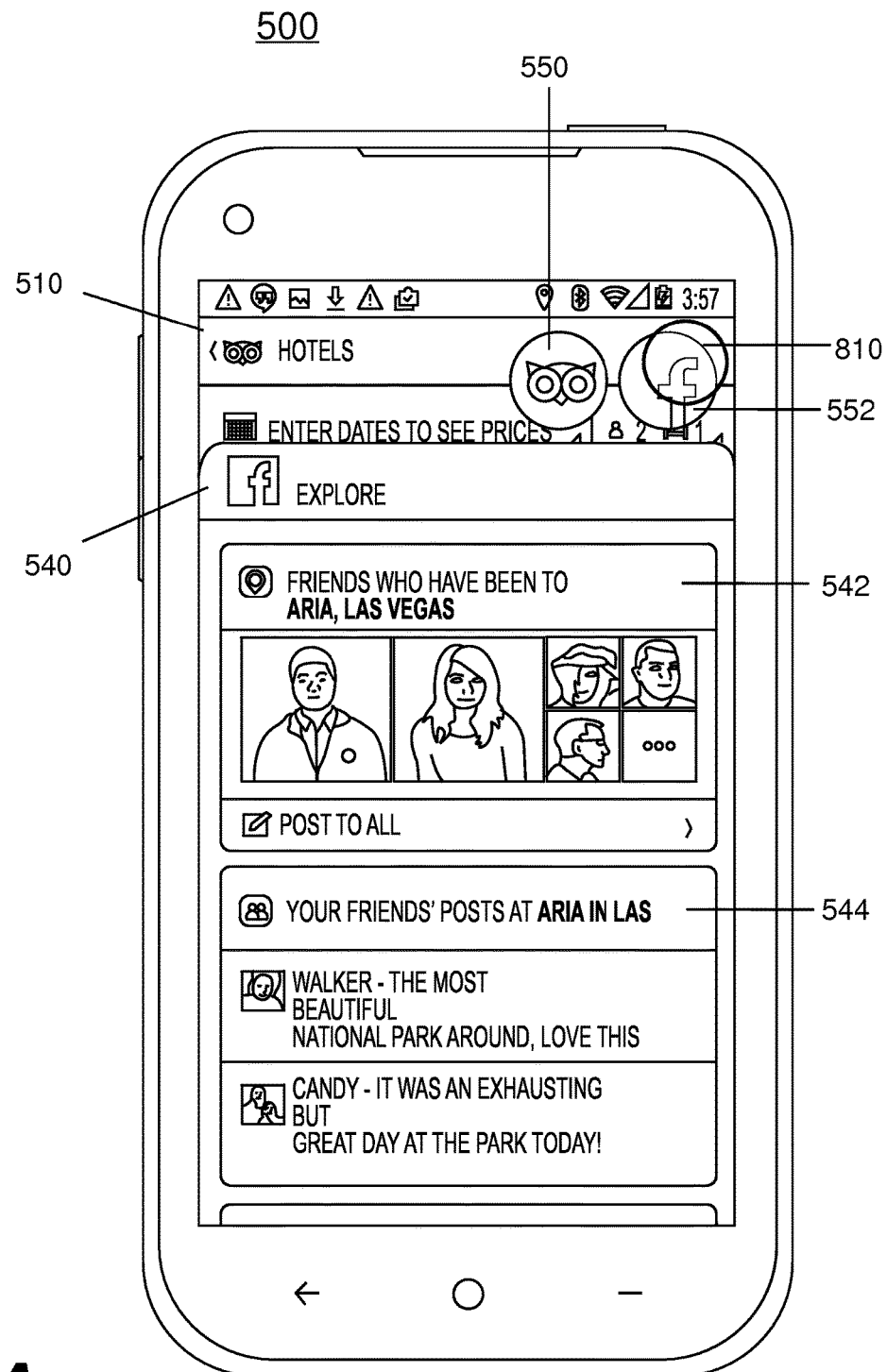
FIGS. 8A and 8B illustrate transitioning from an interface showing the interactive elements to an interface associated with the social-networking system.
Figure 8B:
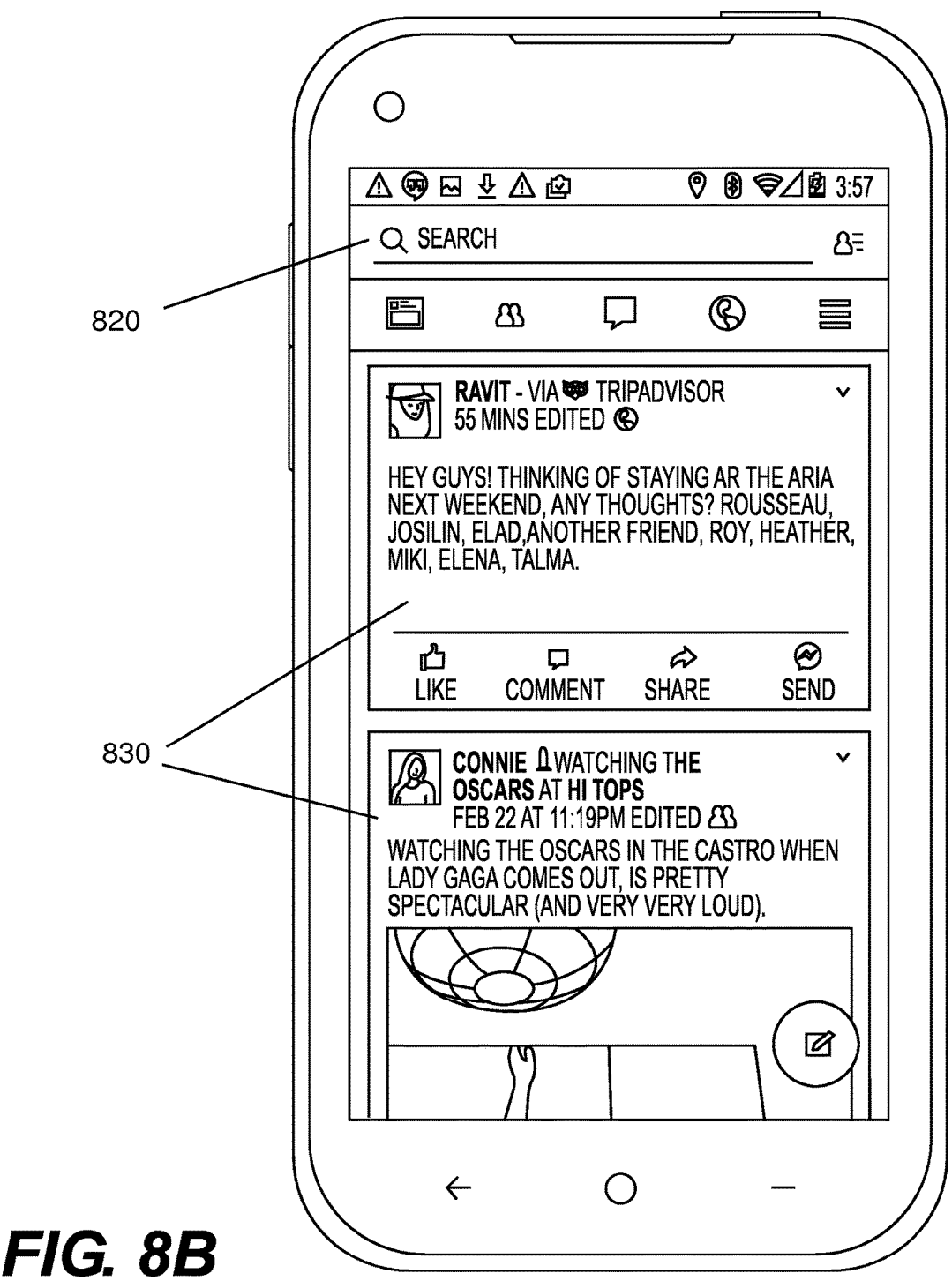

In particular embodiments, user interface 500 may include a first application button 550 corresponding to application 510 that is used to toggle between application 510 and the social-networking information presented in interactive element interface 540. As an example and not by way of limitation, when the user interacts with first application button 550, interactive element interface 540 may be minimized or closed on user interface 500. User interface 500 may also include a second application button 552 corresponding to social-networking system 160 that is used to toggle between user interface 500 of application 510 (including interactive element interface 540) and a separate user interface associated with the online social network. As shown in FIGS. 8A and 8B, in response to a user selection of second application button 552, (e.g., via selection input 810), mobile client system 130 may transition from user interface 500 associated with application 510 to a new user interface 800 associated with application 820. In particular embodiments, application 820 is associated with the online social network of social-networking system 160, and may include content sections 830 (e.g., including posts, comments, shares and reshares, and like-indications associated with users on the online social network) each displaying various social-networking information on the user's online social-networking website.

Figure 6A:
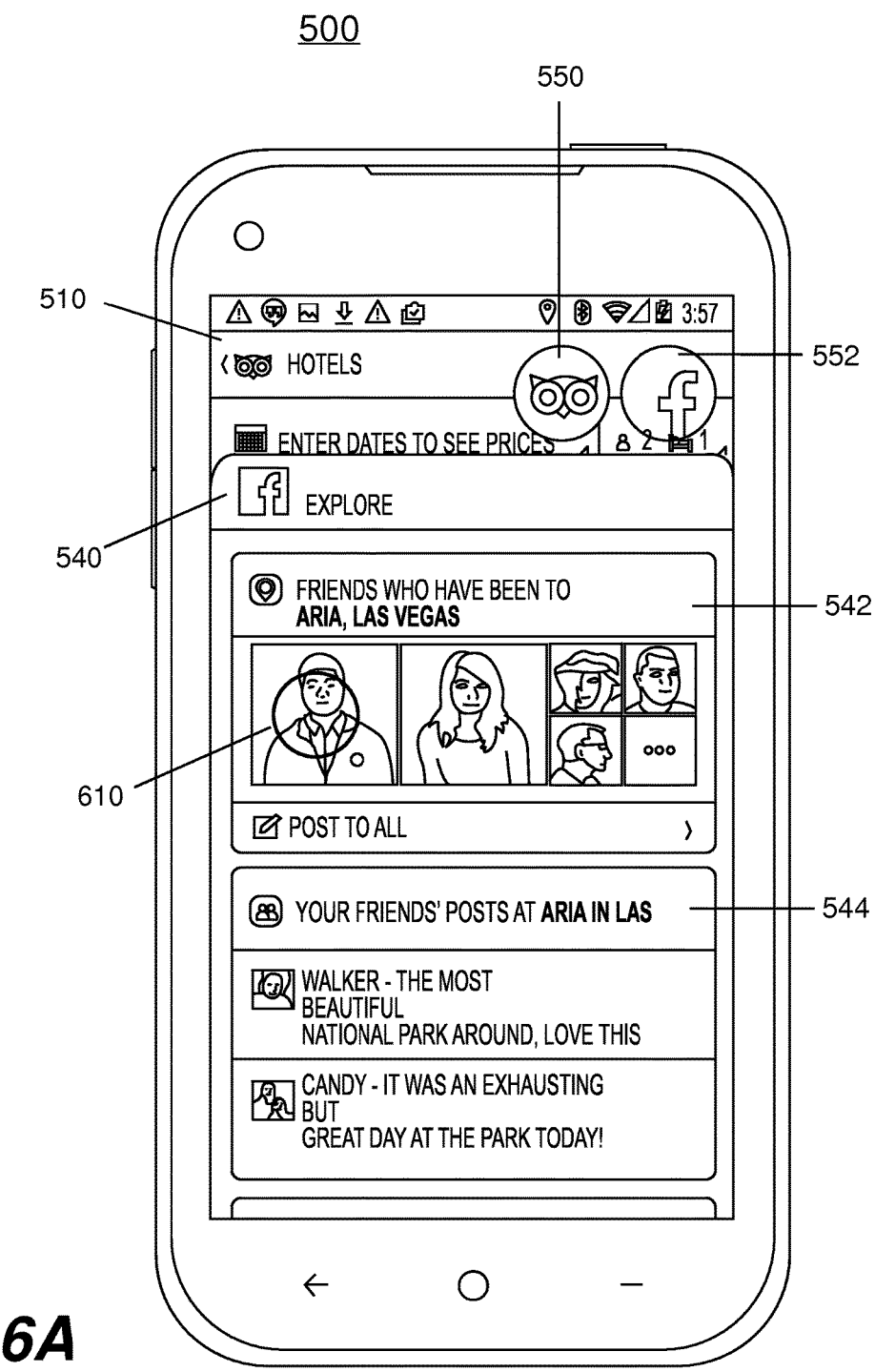
FIGS. 6A6D illustrate example user interactions with the interactive elements associated with the social-networking system.
Figure 6B:
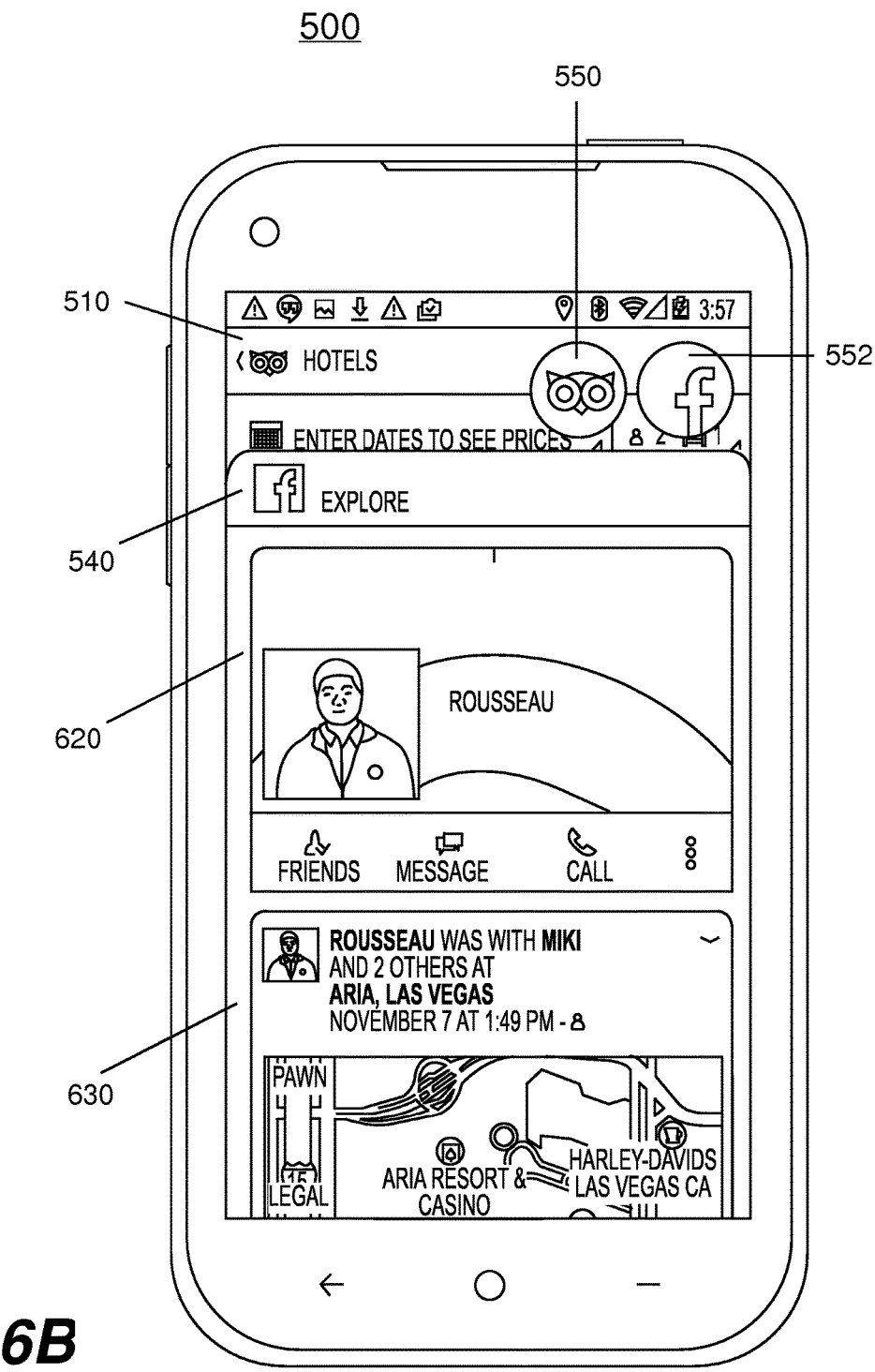
Figure 6C:
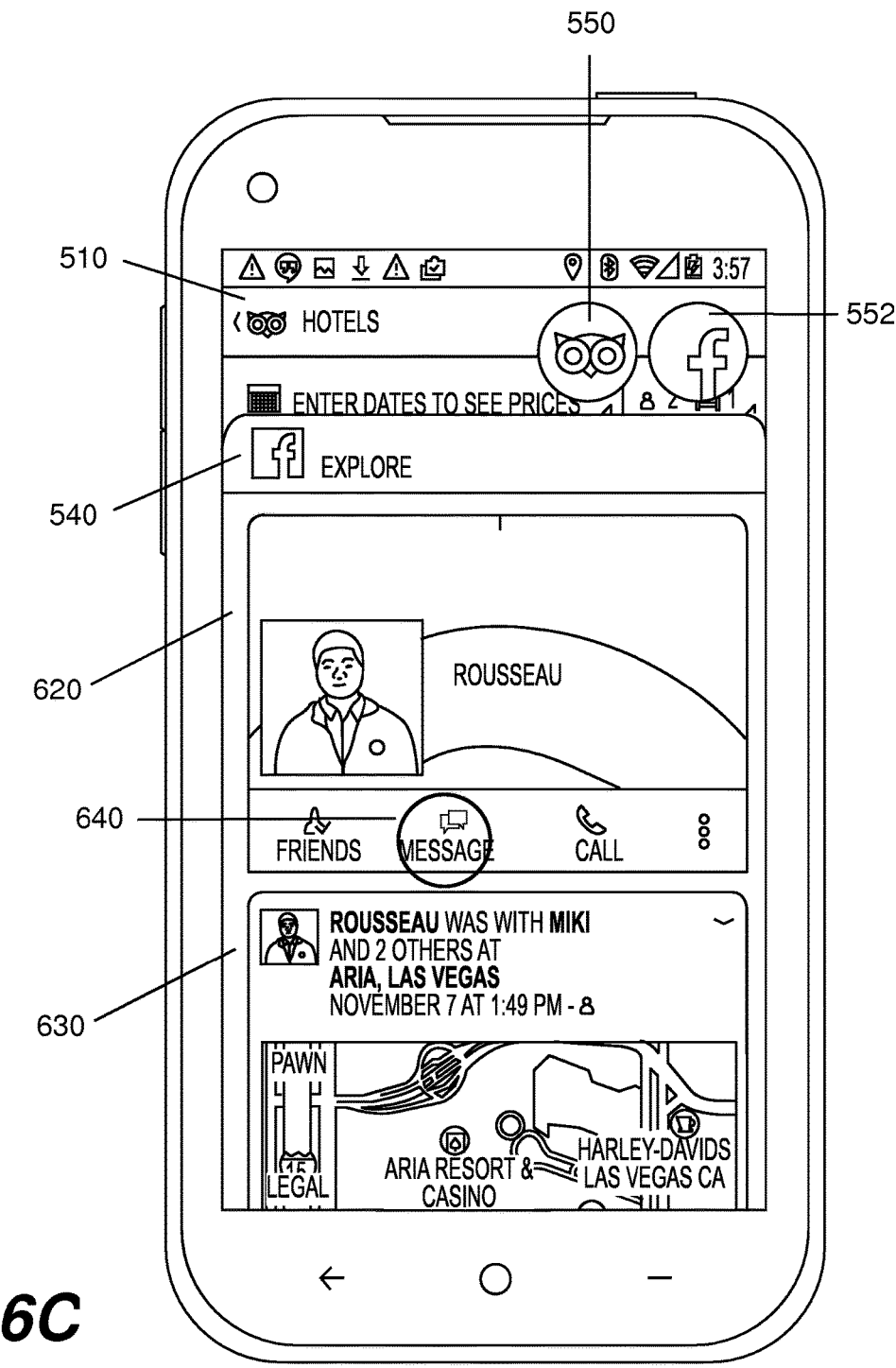
Figure 6D:
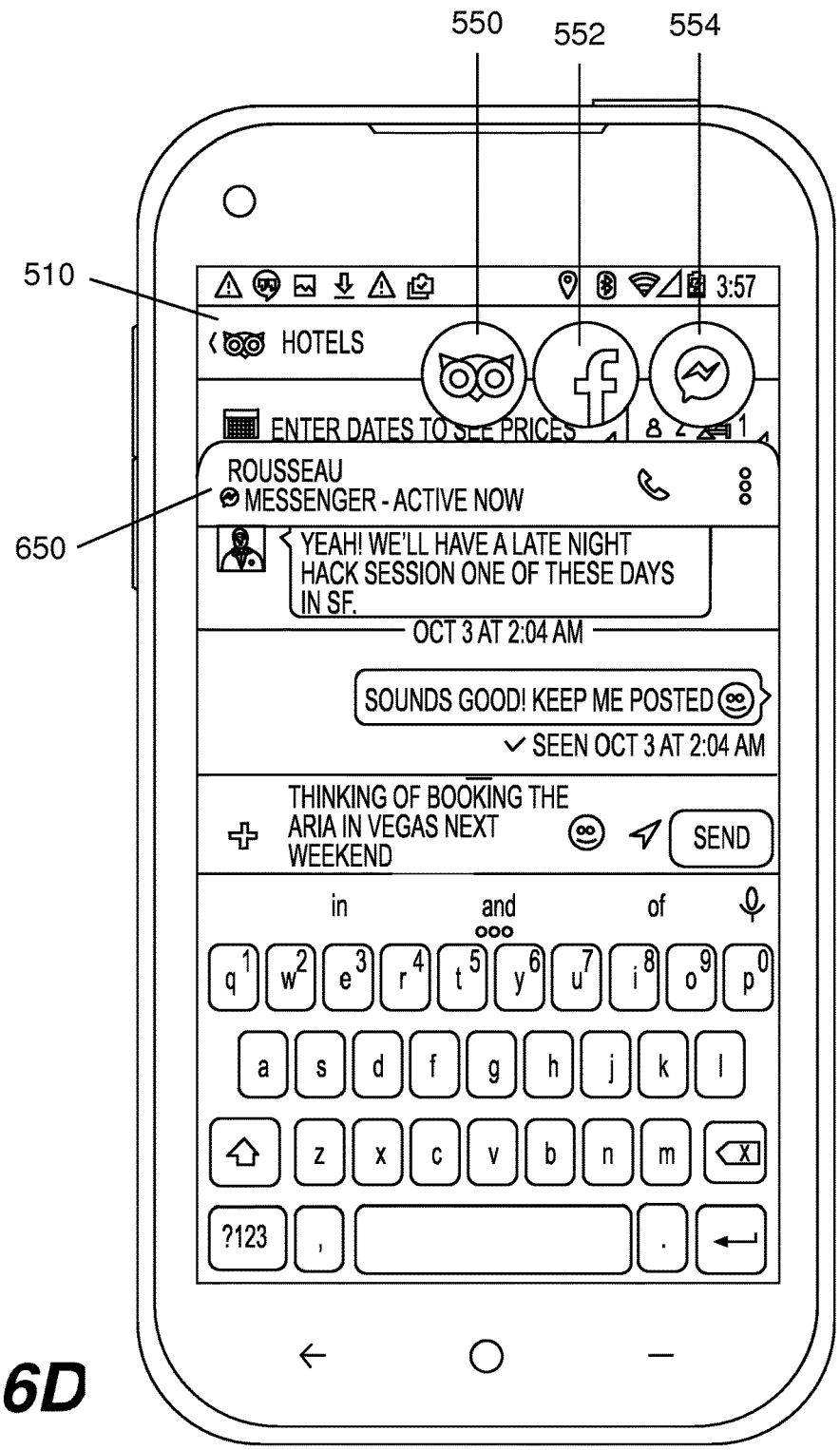
Figure 7A:
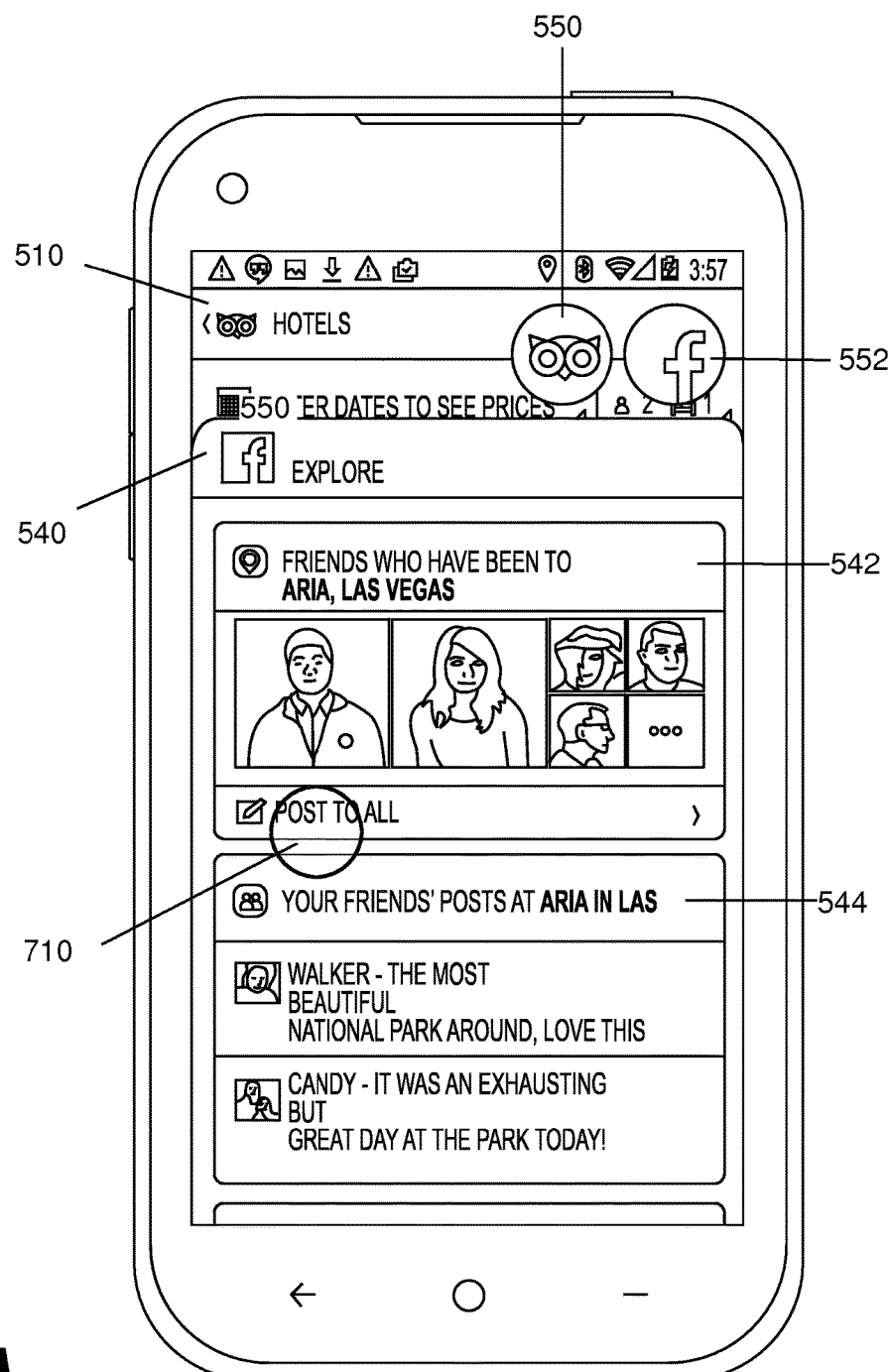
FIGS. 7A-7C illustrate additional example user interactions with the interactive elements associated with the social-networking system.
Figure 7B:
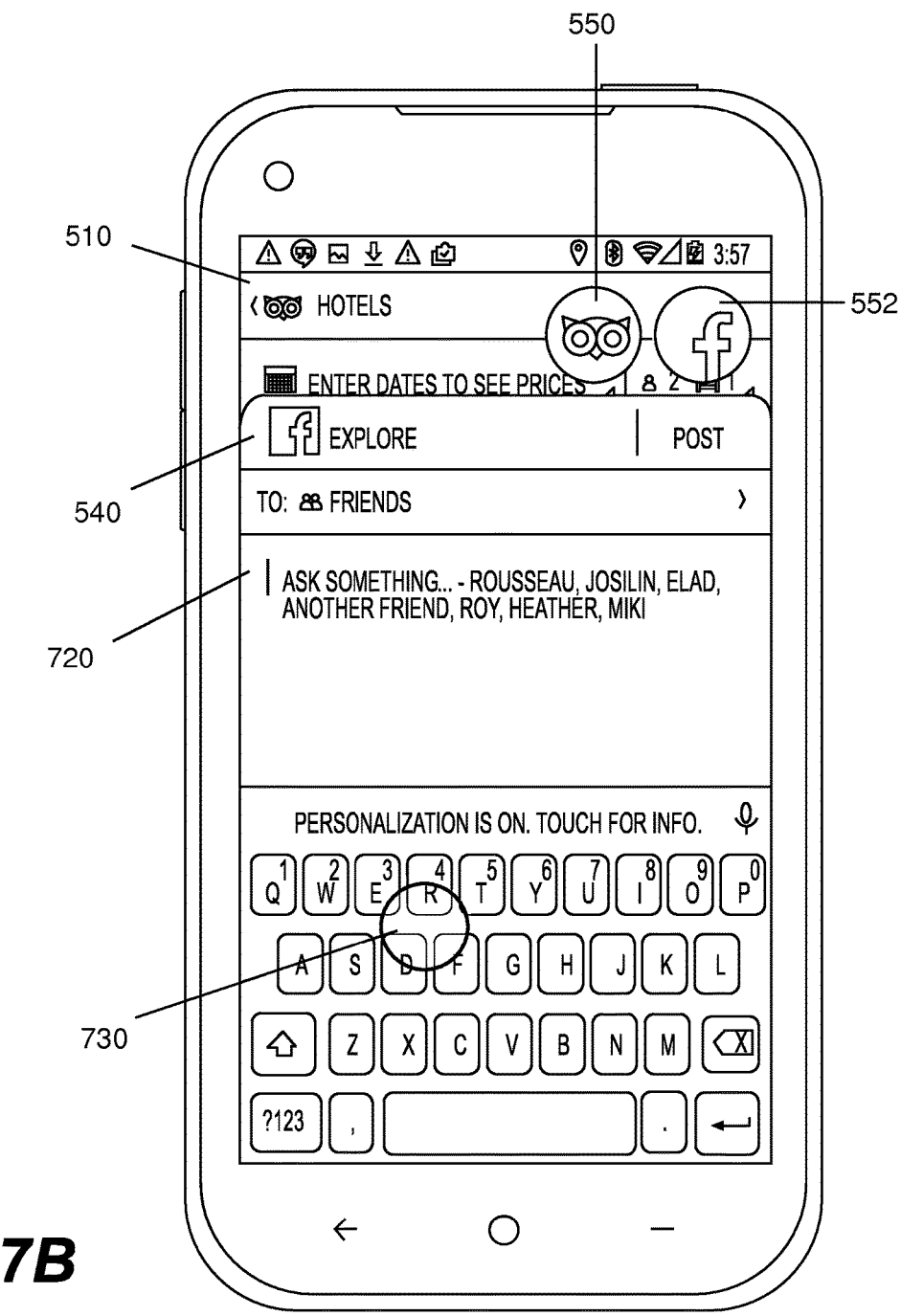
Figure 7C:
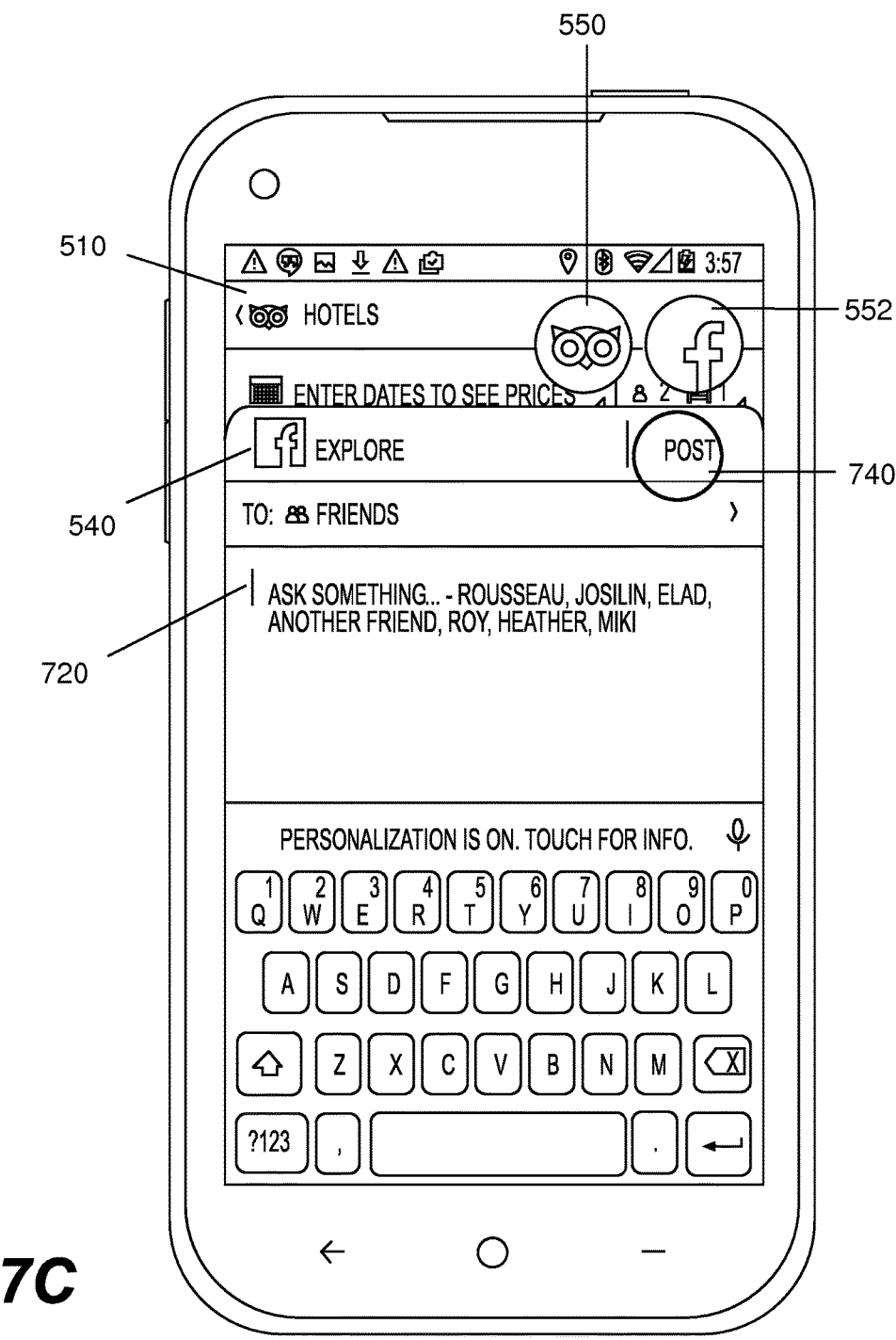

In particular embodiments, the user may interact with interactive element interface 540 to retrieve additional social-networking information while remaining in user interface 500 of application 510. As shown in FIGS. 6A and 6B, when the user selects (e.g., via selection input 610) a profile picture of a friend of the list of friends in first content section 542, the social-networking information of the selected friend retrieved from the online social network may now be populated into interactive element 540 without exiting the user interface 500 of application 510. As an example and not by way of reference, interactive element interface 540 may now include first user content section 620, which includes the profile and background pictures associated with the friend user and includes a list of action items the user may choose from (e.g., message, call, etc.), and section user content section 530, which includes addition social-networking content associated with the friend user (e.g., detailed information on when the friend was at Aria Sky Suites Hotel in Las Vegas, who he was with, etc.). Then, as shown in FIGS. 6C and 6D, the user may interact with the interactive element interface 540 (e.g., via selection input 640) to use additional social-networking capabilities (e.g., instant messaging). When the user uses these additional social-networking capabilities, additional application buttons corresponding to each of these additional social-networking capabilities may appear on user interface 500. As an example and not by way of limitation, third application button 554 may correspond to a messenger application associated with social-networking system 160, and third application button 554 may allow the user to select and toggle between the messenger application, first application button 550 associated with application 510, and second application button 552 corresponding to social-networking system 160. In addition, as shown in FIGS. 7A-7C, the user may alternatively select to post a message to all friends from the list of friends in first content section 542 (e.g., via selection input 710). When this is selected, the social-networking information of all friends of the user are retrieved from the online social network and are populated into a post-generating interface 720 that replaces the previous interface of interactive element 540. Post-generating interface 720 includes an area where the user may type a question and/or comment in keyboard area 730, in addition to a "post" button 740 that the user may select once a message is complete and ready to send. Although this disclosure describes various social-networking capabilities that may be presented on the interactive element interface in a particular manner, this disclosure contemplates any social-networking capabilities that may be presented on the interactive element interface in any suitable manner.

Figure 9:
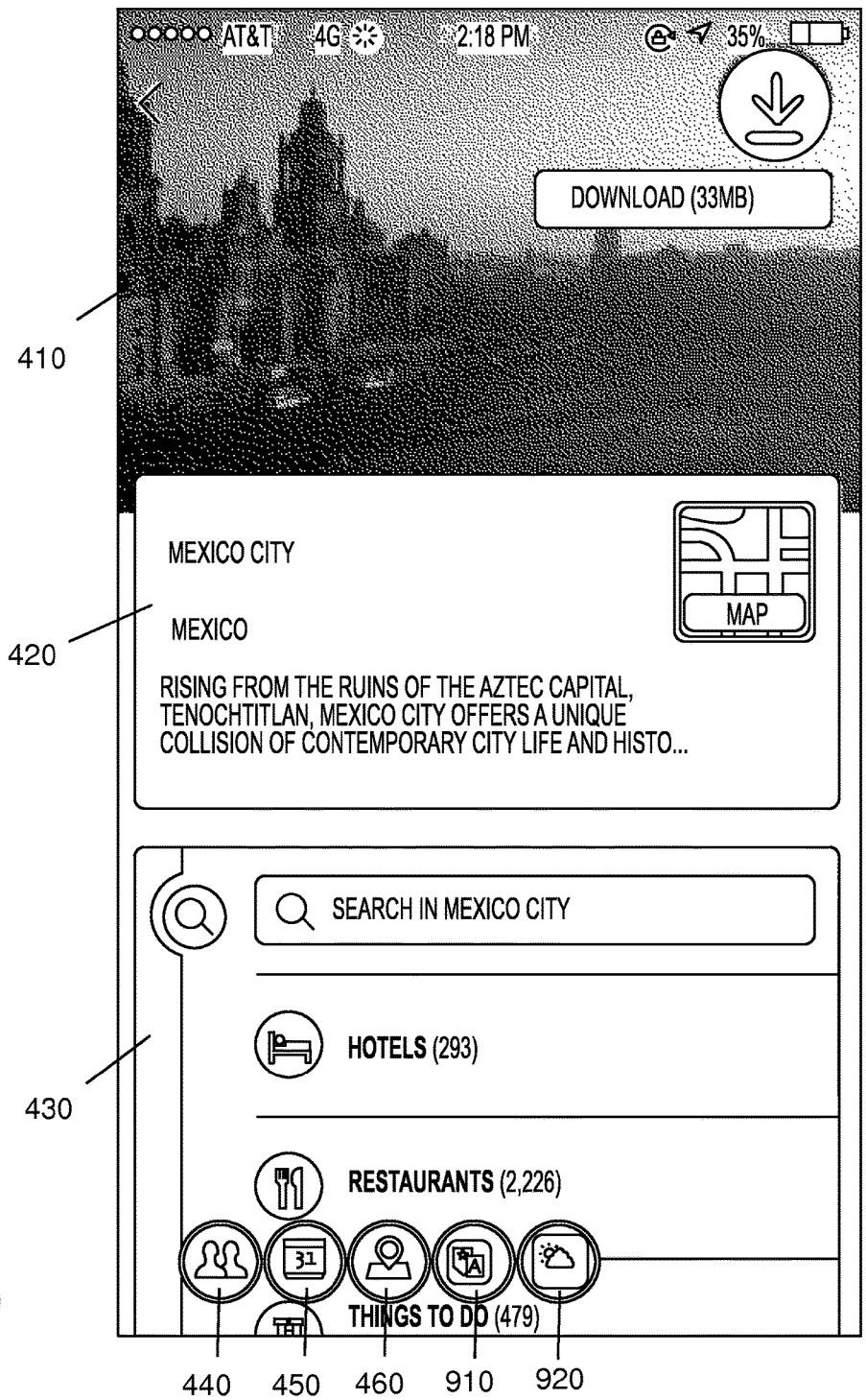
FIG. 9 illustrate example selection and display of interactive elements associated with a third-party applications according to an example embodiment.

FIG. 9 illustrates example selection and display of interactive elements associated with a third-party applications within another third-party application according to an example embodiment. As shown in FIG. 9, user interface 400 of application 410 includes information section 420 and search section 430, in addition to interactive elements 440, 450, 460, and new interactive elements 910, 920. In particular embodiments, interactive elements 440, 450, 460, 910, 920 (e.g., corresponding to social-networking content) may be generated by the social plug-in of client system 130 in response to instructions received from social-networking system 160. Alternatively, new interactive elements 910, 920 may be generated by the social plug-in of client system 130 in response to instructions received from third-party applications corresponding to each of the interactive elements. As an example and not by way of limitation, interactive element 910 may correspond to a third-party language-translation application, and thus may be generated by the social plug-in of client system 130 by instructions received from the corresponding language-translation application. As another example and not by way of limitation, interactive element 920 may correspond to a third-party weather application, and thus may be generated by the social plug-in of client system 130 by instructions received from the corresponding weather application. In particular embodiments, content associated with the third-party weather application and the third-party language-translation application may be requested through the application associated with social-networking system 160 via the deep-link index, as discussed in more detail below. This allows for the application associated with social-networking system 160 to be able to provide content relevant to the third-party application the user is viewing and/or interacting with (e.g., the language-translation application, the weather application, etc.) by directly displaying this content via the social plug-in within the first application without requiring the user to separately access the third-party application to separately search for this content, as discussed above.

Figure 10:
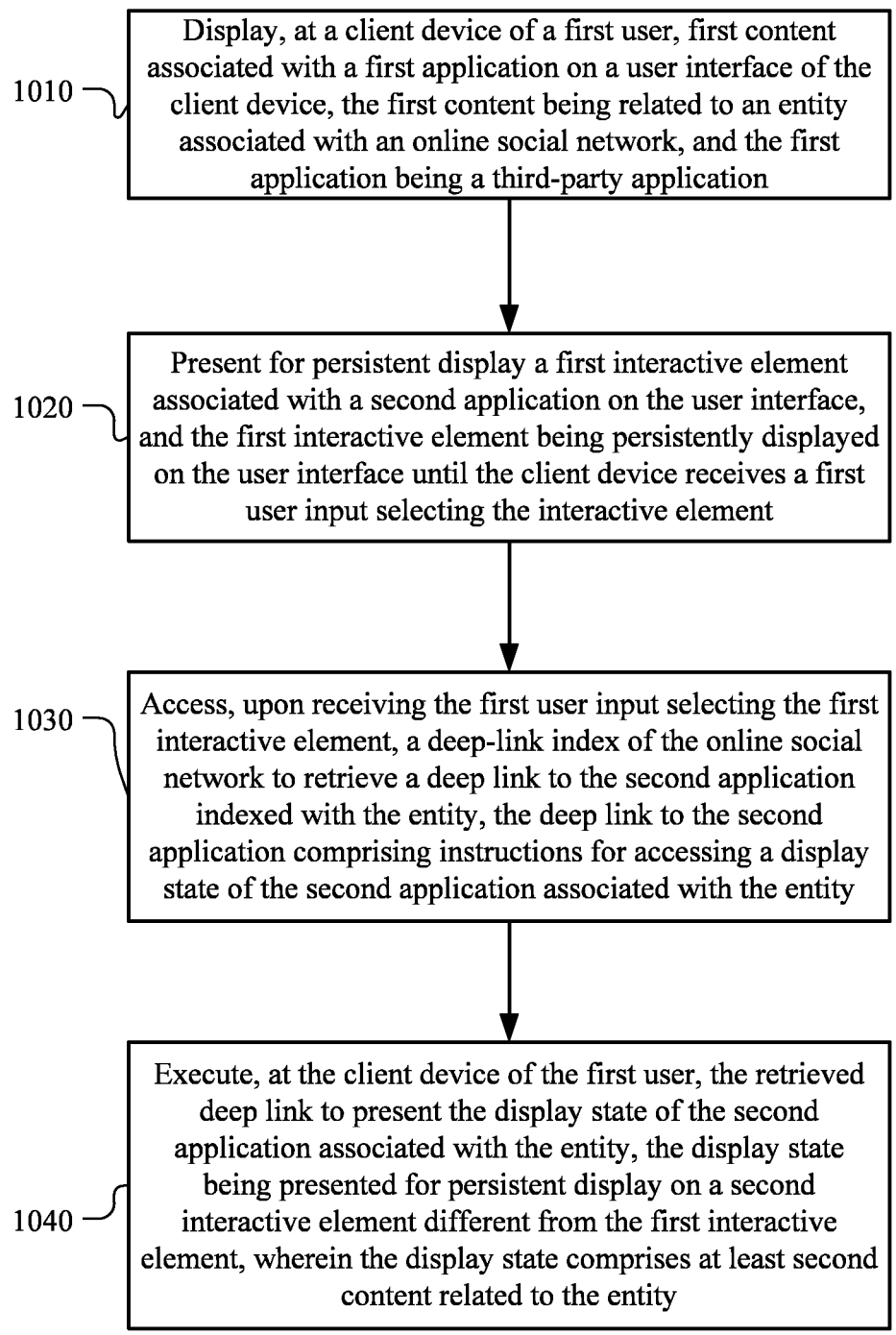

FIG. 10 illustrates an example method 1000 for interacting with one or more interactive elements activated by a social plug-in. The method may begin at step 1010, where social-networking system 160 may display, at a client system 130 of a first user, first content associated with a first application on a user interface of the client system 130. The first content may be related to an entity associated with an online social network, and the first application may be a third-party application At step 1020, social-networking system 160 may present for persistent display a first interactive element associated with a second application on the user interface. The first interactive element may be persistently displayed on the user interface until the client system 130 receives a first user input selecting the interactive element. At step 1030, social-networking system 160 may access, upon receiving the first user input selecting the first interactive element, a deep-link index of the online social network to retrieve a deep link to the second application indexed with the entity. The deep link to the second application may include instructions for accessing a display state of the second application associated with the entity. At step 1040, social-networking system 160 may execute, at the client system 130 of the first user, the retrieved deep link to present the display state of the second application associated with the entity. The display state may be presented for persistent display on a second interactive element different from the first interactive element. In addition, the display state may include at least second content related to the entity. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for interacting with one or more interactive elements activated by a social plug-in in order to display content associated with the online social network including the particular steps of the method of FIG. 10, this disclosure contemplates any suitable method for interacting with one or more interactive elements activated by a social plug-in in order to display content associated with the online social network, including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface/view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Search Indices for Social Plug-ins

In particular embodiments, social-networking system 160 may build an index of deep links associated with particular nodes (including, e.g., user nodes 202 and concept nodes 204) of social graph 200 of social-networking system 160. Each indexed deep link may link to particular content associated with that node within a third-party application. The deep-link index may be built using information received from the third-party application via a social plug-in associated with social-networking system 160. In addition, the third-party application may use the social plug-in to fetch social-networking content associated with particular nodes of social graph 200. Requests from third-party applications may include deep link information indicating the specific view state (e.g., display state) within the third-party application where content corresponding to a node of social graph 200 is referenced. In particular embodiments, the social plug-ins may also be configured to monitor interaction statistics associated with each deep link (e.g., using reverse deep-links, as discussed above). As an example and not by way of limitation, the social plug-ins may track information describing user actions on the third-party application (e.g., dwell times, date, time, and time period(s) of engagement with an application, etc.). In particular embodiments, building a deep-link index of that includes one or more deep links to particular content associated with particular nodes of social graph 200 may allow the social plug-in to retrieve and display social-networking content and/or third-party content on a user interface of mobile client system 130 within a second application (e.g., another third-party application) without the information being processed or stored on the second application. In addition, this deep-link index may be stored on social-networking system 160, which allows the online social network to be able to access a universal index for one or more entities (e.g., nodes of social graph 200) and provide this information to one or more third-party applications which allows for applications to communicate with each other about specific social-networking entities by searching this universal index (e.g., based on entity identifiers and via the social plug-in). Although this disclosure describes building a deep-link index in a particular manner, this disclosure contemplates building a deep-link index in any suitable manner.

In particular embodiments, in order to build the deep-link index, the social plug-in may provide a social-networking information call button at certain view states within a third-party application. As an example and not by way of limitation, as shown in FIG. 5A, a third-party travel-recommendation application (e.g., application 510) that, in response to a search query for a particular geographic location, provides a list of hotels corresponding that geographic location, may include interactive element 530 (e.g., an "Explore" button) next to one or more of the hotel entries on the list. When the user is viewing and/or interacting with application 510 and scrolls through the list of hotels displayed on user interface 500, the user may select interactive element 530 (e.g., by clicking on the "Explore" button) associated with a particular hotel to retrieve social-networking information for that particular hotel. Specifically, when the user selects interactive element 530, the social plug-in may send a request from application 510 to social-networking system 160 for social-networking information associated with the entity of the particular hotel. In particular embodiments, social-networking system 160 may receive, from a first application via the social plug-in associated with the online social network, a request for content from a second application, the content being related to an entity associated with the online social network. The first application may be a third-party application (such as travel-recommendation application 510). The second application may be an application associated with the online social network. Alternatively, the second application may be another third-party application (e.g., a second third-party application different from the first third-party application).

In particular embodiments, the entity may correspond to a node of social graph 200 of the online social network. As an example and not by way of limitation, the entity may correspond to a user node 202, which may correspond to a user of social-networking system 160. As discussed above, a user may be an individual (human user), an entity (e.g., an enterprise, business, or third-party application), or a group (e.g., of individuals or entities) that interacts or communicates with or over social-networking system 160. As another example and not by way of limitation, the entity may correspond to a concept node 204, which may correspond to a concept. As discussed above, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. In the example of FIG. 5A, when a user selects interactive element 530, a request is sent to social-networking system 160 for social-networking content corresponding to the entity of "Aria Sky Suites Hotel" (e.g., a concept node 204).

In particular embodiments, the request received from the first application may include an entity-identifier of the entity. The entity-identifier for the entity may be used to identify content related to the entity (e.g., posts/reviews by the user's friends relating to the selected hotel at the particular geographic location). The entity-identifier may be stored in a data store 164 associated with social-networking system 160. The content requested by the first application (e.g., third-party travel-recommendation application) from the second application (e.g., social-networking application or another third-party application) may include information associated with the node of social graph 200 of the online social network that corresponds to the entity. As an example and not by way of limitation, the entity-identifier of the entity may include a social-network ID corresponding to a node (e.g., a first node) of the social graph 200 of the online social network. In the example of FIG. 5A, the entity-identifier for the entity "Aria Sky Suites Hotel" may be social-network ID "E01." As another example and not by way of limitation, the entity-identifier of the entity may include a text-string description comprising one or more n-grams. In the example of FIG. 5A, the entity-identifier for the entity "Aria Sky Suites Hotel" may be the text-string "Aria Sky Suites Hotel Las Vegas Nev." As discussed above, the text-string description may be parsed to determine the node of the social graph 200 of the online social network that corresponds to the text-string description. As an example and not by way of limitation, social-networking system 160 may parse the text-string description and identify portions of the text-string description that correspond to particular social-graph elements, and then search a data store 164 (or, in particular, a social-graph database) to identify content matching the portions of the text-string description. The search engine may conduct a search based on the portions of the text-string description using various search algorithms and generate search results that identify resources or content (e.g., user-profile pages, content-profile pages, or external resources) that are most likely to be related to the text-string description.

In particular embodiments, the request received from the first application may also include an application-identifier of the first application, and a deep link to the first application. The application-identifier and the deep link may be stored in a data store (e.g., data store 164) associated with social-networking system 160. The application-identifier of the first application may identify the application that corresponds to the received deep link. In addition, the application-identifier may include a social-network ID corresponding to a node (e.g., a second node) of social graph 200 of the online social network, in which the corresponding node is associated with the first application. In the example of FIG. 5A, the application-identifier of the first application may be social-network ID "App01," and this application-identifier may be associated with the node of social graph 200 that corresponds to the travel-recommendation application 510 (e.g., TravelAdvisor®). The deep link to the first application may be linked to the application-identifier of the first application. In addition, the deep link may include instructions for accessing a display state of the first application associated with the request. In the example of FIG. 5A, the deep link for the entity "Aria Sky Suites Hotel" associated with application-identifier "App01" may be "Link01," and may include instructions for accessing a view state within third-party travel-recommendation application 510 that displays content on Aria Sky Suites Hotel in Las Vegas, Nev. As summarized in TABLE 1 below, the request received from the third-party application that is used to create the deep-link index may include the entity-identifier of the entity, the application-identifier of the third-party application, and the deep link to the third-party application. Although this disclosure describes particular types of information collected from third-party applications in a particular manner, this disclosure contemplates all types of information collected from third-party applications that may be collected in any suitable manner.

TABLE 1

Contents of Request from Third-party
Travel-Recommendation Application 510

| | Type of Content | Identifier for Application 510 |
|---|---|---|
| Entity identifier | Social-network ID | E01 |
| | Text-string description | Aria Sky Suites Hotel in Las Vegas, Nevada |
| | Application identifier | App01 |
| | Deep link | Link01 |

In particular embodiments, the social plug-in may specify in the request received from the first application the type of social-networking content to be fetched (e.g., posts, reviews, entity information, reaction-card content, etc.). Once the social-networking system 160 determines what type of data to send to the third-party application based on the social plug-in and the social-network ID or text-string description, the requested information is retrieved and sent to the third-party application (e.g., the travel-recommendation application) via the mobile social plug-in. The third-party application receives this social-networking information, and then opens an interactive element interface to display the social-networking information to the user (e.g., interactive element interface 540 shown in FIGS. 5C and 5D, as discussed above). Social-networking system 160 may also index the deep link information received from the social plug-in, which indicates the specific view state within the third-party application where the social-networking entity corresponding to the selected hotel at the particular geographic location is referenced, in a deep-link index stored on social-networking system 160, as discussed below.

Social-networking system 160 may access a deep-link index of the online social network including a plurality of records indexing deep links to third-party applications. In particular embodiments, the deep-link index may be an application index. The application index may be a forward index that maps a third-party application with one or more deeps links corresponding to particular display states within the third-party application. Generally, a forward index for a first object-type (e.g., a third-party application) may include a list of search indices listed corresponding to the first object-type. In particular embodiments, each record of the application index may include an application identifier corresponding to a third-party application, one or more deep links corresponding to the application identifier, and metadata associated with each deep link. As discussed above, the entity may correspond to a node of social graph 200 of the online social network, and the entity-identifier of the entity may include a social-network ID corresponding to the node of social graph 200. In addition, as discussed above, each deep link may include instructions to access a view state of the third-party application associated with an entity of the online social network. As an example and not by way of limitation, as shown in FIGS. 5A and 9, and TABLE 2 below, an application index may include a plurality of records for deep links of third-party application 510 (e.g., associated with application identifier "App01") including deep links "Link01," "Link02," "Link03," and "Link04." Deep link "Link01" may correspond to a view state that comprises content associated with Aria Sky Suites Hotel in Las Vegas, Nev. (e.g., associated with entity identifier E01) within application 510. Deep link "Link02" may correspond to a view state state that comprises content associated with Mandarin Oriental Hotel in Las Vegas, Nev. (e.g., associated with entity identifier E02) within application 510. Deep link "Link03" may correspond to a view state that comprises content associated with Skylofts at MGM Grand Hotel in Las Vegas, Nev. (e.g., associated with entity identifier E03) within application 510. In addition, deep link "Link04" may correspond to a view state that comprises content associated with Mexico City, Mexico (e.g., associated with entity identifier E05) within application 510. As another example and not by way of limitation, as shown in FIG. 9 and TABLE 2, the application index may also include a plurality of records for deep links of third-party applications corresponding to interactive element 910 (e.g., Link05 of a third-party language-translation application App02) and interactive element 920 (e.g., Link06 and Link07 of a third-party weather application App03). In particular, deep link "Link05" may correspond to a view state that comprises content associated with language-translation services relevant to Mexico City, Mexico (e.g., an English-to-Spanish and Spanish-to-English dictionary associated with entity identifier E05) within the third-party language-translation application. In addition, deep link "Link06" may correspond to a view state that comprises content associated with the weather in Las Vegas, Nev. (e.g., associated with entity identifier E04), and deep link "Link07" may correspond to a view state that comprises content associated with the weather in Mexico City, Mexico (e.g., associated with entity identifier E05), within the third-party weather application. In particular embodiments, a particular entity that corresponds to a particular node of social graph 200 may correspond to multiple deep links each associated with a different third-party applications. As an example and not by way of limitation, as shown in TABLE 2, the entity Mexico City, Mexico, corresponding to entity identifier E05, is associated with a first deep link Link04 that corresponds to the display state that displays travel-recommendation content for Mexico City within a third-party travel-recommendation application (e.g., associated with application identifier App01), a second deep link Link05 that corresponds to the display state that displays language-translation services for Mexico City within a third-party language-translation application (e.g., associated with application identifier App02), and a third deep link Link07 that corresponds to the display state that displays weather information for Mexico City within a third-party weather application (e.g., associated with application identifier App03).

TABLE 2

Example Application Index

| Third-party application | App ID | Deep link(s) | Entity | Entity ID | Metadata |
|---|---|---|---|---|---|
| Travel-recommen-dation application | App01 | Link01 | Aria Sky Suites Hotel in Las Vegas, Nevada | E01 | M01 |
| | | Link02 | Mandarin Oriental Hotel in Las Vegas, Nevada | E02 | M02 |
| | | Link03 | Skylofts at MGM Grand Hotel in Las Vegas, Nevada | E03 | M03 |
| | | Link04 | Mexico City, Mexico | E05 | M04 |
| Language-translation application | App02 | Link05 | Mexico City, Mexico | E05 | M05 |
| Weather application | App03 | Link06 | Las Vegas, Nevada | E04 | M06 |
| | | Link07 | Mexico City, Mexico | E05 | M07 |

In particular embodiments, the metadata may include information associated with user interactions with each deep link. As an example and not by way of limitation, the metadata may include information associated with one or more dwell times of each of one or more users of the online social network associated with each of the deep links. As another example and not by way of limitation, the metadata may include information associated with a number of interactions of each of the one or more users associated with each of the deep links. As shown in TABLE 2, metadata M01, M02, M03, M04, M05, M06, and M07, corresponding to deep links Link01, Link02, Link03, Link04, Link05, Link06, and Link 07, respectively, may include one or more of the above-described information. In addition, although metadata M04, M05 and M07 all correspond to the same entity (e.g., Mexico City, Mexico, associated with entity identifier E05), because the metadata includes information associated with the user interactions with each deep link, the metadata associated with the same entity may nonetheless contain different information depending on what user-interaction information is collected with each deep link. Although this disclosure describes generating an application index in a particular manner, this disclosure contemplates generating an application index in any suitable manner.

In particular embodiments, the deep-link index may be an entity index. The entity index may be an inverted index that maps an entity associated with the online social network with one or more deeps links corresponding to particular display states within a third-party application. Generally, an inverted index for a first object-type (e.g., one or more deep links) may include a list of search indices listed corresponding to a second object-type (e.g., an entity of the online social network), and may map a query term (e.g., an entity identifier) with one or more objects associated with the second object-type. Each record of the entity index may include an entity identifier of an entity associated with a node of a social graph of the online social network, one or more deep links corresponding to the entity ID, and metadata associated with each deep link. As discussed above, each deep link may include instructions to access a display state of a third-party application associated with the entity. As an example and not by way of limitation, as shown in FIGS. 5A and 9, and TABLE 3 below, an entity index may include a plurality of records for deep links of third-party applications associated with Las Vegas, Nev. and Mexico. For the entity of Aria Sky Suites Hotel in Las Vegas, Nev., the entity index may include entity identifier E01, corresponding deep link "Link01" (e.g., for accessing a display state of application 510 associated with application identifier "App01"), and corresponding metadata M01. For the entity of Mandarin Oriental Hotel in Las Vegas, Nev., the entity corresponding deep link "Link04" (e.g., for accessing a display state of application 510 associated with application identifier "App01") and corresponding metadata M04, a third-party language-translation application with corresponding deep link "Link05" (e.g., for accessing a display state of an English-to-Spanish and Spanish-to-English dictionary of the language-translation application associated with application identifier "App02") and corresponding metadata M05, and a third-party weather application with corresponding deep link "Link07" (e.g., for accessing a display state of the weather application associated with application identifier "App03") and corresponding metadata M07. As discussed above, a particular entity that corresponds to a particular node of social graph 200 may correspond to multiple deep links each associated with a different third-party application. As an example and not by way of limitation, as shown in TABLE 3, the entity Mexico City, Mexico, corresponding to entity identifier E05, is associated with deep link Link04 (e.g., corresponding to travel-recommendation content for Mexico City within a third-party travel-recommendation application), deep link Link05 (e.g., correspond to language-translation services for Mexico City within a third-party language-translation application), and deep link Link07 (e.g., corresponding to weather information for Mexico City within a third-party weather application).

TABLE 3

Example Entity Index

| Entity | | Entity ID | Deep Link(s) | App ID | Third-party application | Metadata |
|---|---|---|---|---|---|---|
| Las Vegas, NV | Aria Sky Suites Hotel in Las Vegas, Nevada | E01 | Link01 | App01 | Travel-recommendation application | M01 |
| | Mandarin Oriental Hotel in Las Vegas, Nevada | E02 | Link02 | App01 | Travel-recommendation application | M02 |
| | Skylofts at MGM Grand Hotel in Las Vegas, Nevada | E03 | Link03 | App01 | Travel-recommendation application | M03 |
| | Las Vegas, Nevada | E04 | Link06 | App03 | Weather application | M06 |
| Mexico | Mexico City, Mexico | E05 | Link04 | App01 | Travel-recommendation application | M04 |
| | | | Link05 | App02 | Language-translation application | M05 |
| | | | Link07 | App03 | Weather application | M07 | index may include entity identifier E02, corresponding deep link "Link02" (e.g., for accessing a display state of application 510 associated with application identifier "App01"), and corresponding metadata M02. For the entity of Skylofts at MGM Grand Hotel in Las Vegas, Nev., the entity index may include entity identifier E03, corresponding deep link "Link03" (e.g., for accessing a display state of application 510 associated with application identifier "App01"), and corresponding metadata M03. For the entity of weather in Las Vegas, Nev., the entity index may include entity identifier E04, corresponding deep link "Link06" (e.g., for accessing a display state of the weather application associated with application identifier "App03"), and corresponding metadata M06. For the entity of Mexico City, Mexico, the entity index may include entity identifier E05, associated with a third-party travel-recommendation application with In addition, as discussed above, the metadata (e.g., M01, M02, M03, M04, M05, M06, M07) may include information associated with user interactions with each deep link. As an example and not by way of limitation, the metadata may include information associated with one or more dwell times of each of one or more users of the online social network associated with each of the deep links. As another example and not by way of limitation, the metadata may include information associated with a number of interactions of each of the one or more users associated with each of the deep links Although this disclosure describes generating an entity index in a particular manner, this disclosure contemplates generating an entity index in any suitable manner.

In particular embodiments, social-networking system 160 may store the deep-link index (e.g., the application index and/or the entity index) in a database (e.g., stored in data store 164) associated with the online social network. In particular embodiments, social-networking system 160 may generate a record in the deep-link index corresponding to the requested entity. The record may include the entity-identifier of the entity, the application-identifier of the first application, and the deep link to the first application. In particular embodiments, social-networking system 160 may receive the requested content from the second application, wherein the received content is sent via the social plug-in and not shared with (e.g., not accessible by) the first application (e.g., sent without being processed or stored on the third-party application). In addition, in particular embodiments, social-networking system 160 may further request authentication information for accessing the second application. As an example and not by way of limitation, social-networking system 160 may request user authentication information (e.g., username and password information) associated with accessing the online social network from the client system 130 to access the second application (e.g., an application associated with social-networking system 160). In particular embodiments, the authentication information may be sent via the social plug-in and not accessible by the first application (e.g., sent without being processed or stored on the third-party application).

As more third-party applications use the social plug-in to send information to social-networking system 160 on deep links indicating the specific view state within the third-party applications where a requested social-networking entity is referenced, social-networking system 160 can collect this information and generate additional records in the deep-link index including this information. This may result in the indexing of deep links to essentially all of the different entry points, different pages, and/or end points associated with different social-networking entities within third-party applications, which can be used to generate a universal index for various entities associated with the online social network, which allows for applications to communicate with each other about specific social-networking entities by searching this universal index (e.g., based on entity identifiers and via the social plug-in). In addition, the social plug-in may be configured to monitor dwell times, date, time, and time period(s) of engagement with an application, other suitable data, and any combination thereof (e.g., by using reverse deep links, as discussed above), which may also be included in the deep-link index. Moreover, this method of searching and pulling specific social-networking information via the social plug-in bypasses exchanging and/or storing social-networking information on the third-party application, which allows third-party applications to effectively utilize social-networking information while preserving the privacy and security of such information. Although this disclosure describes generating a deep-link index in a particular manner, this disclosure contemplates generating a deep-link index in any suitable manner.

Figure 11:
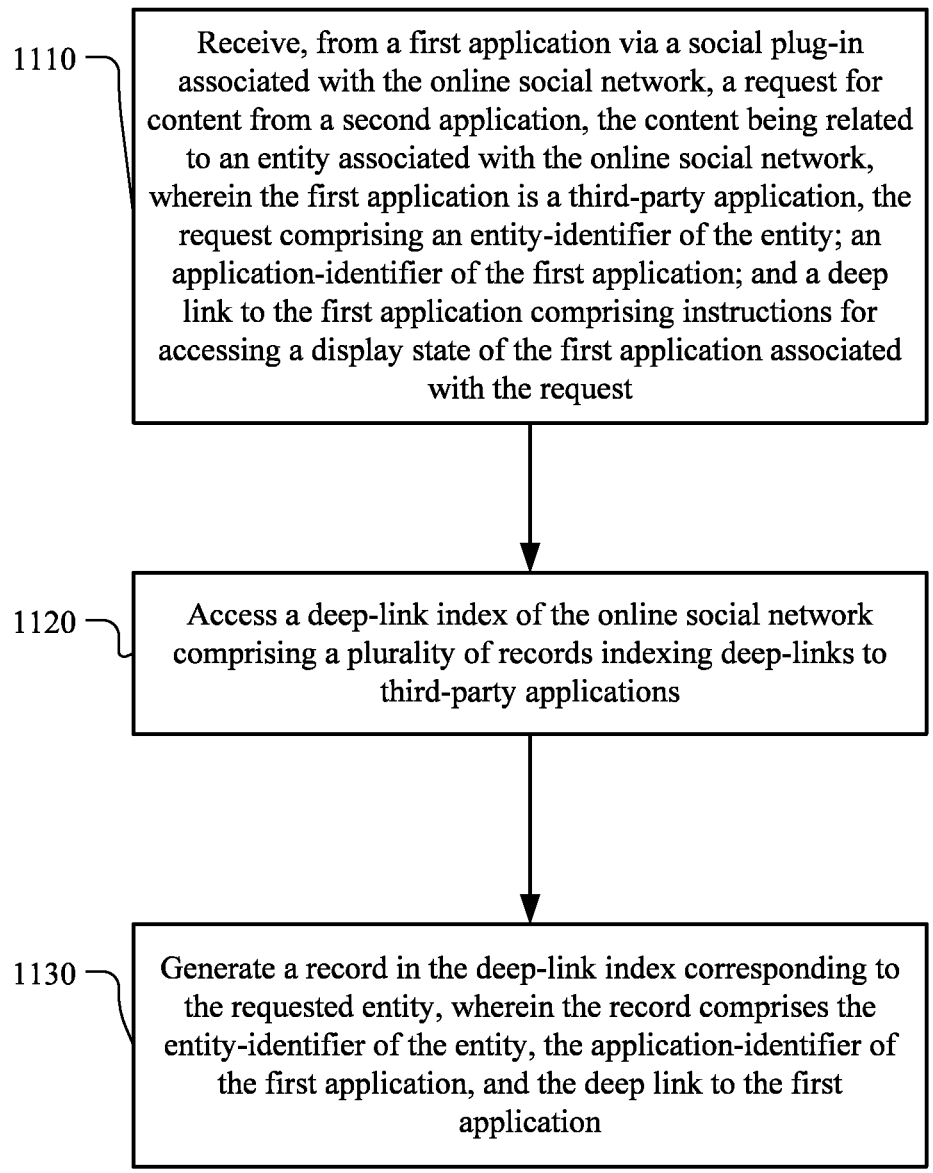
FIG. 11 illustrates an example method for generating a deep-link index.

FIG. 11 illustrates an example method 1100 for generating a deep-link index. The method may begin at step 1110, where social-networking system 160 may receive, from a first application via a social plug-in associated with the online social network, a request for content from a second application, the content being related to an entity associated with the online social network. the first application is a third-party application. The request may include an entity-identifier of the entity, an application-identifier of the first application, and a deep link to the first application including instructions for accessing a display state of the first application associated with the request. At step 1120, social-networking system 160 may access a deep-link index of the online social network comprising a plurality of records indexing deep-links to third-party applications. At step 1130, social-networking system 160 may generate a record in the deep-link index corresponding to the requested entity. The record may include the entity-identifier of the entity, the application-identifier of the first application, and the deep link to the first application. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for generating a deep-link index including the particular steps of the method of FIG. 11, this disclosure contemplates any suitable method for generating a deep-link index including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Searching for Application Content with Social Plug-ins

In particular embodiments, social-networking system 160 may use a deep-link index to search and retrieve specific content associated with a particular entity via a social plug-in. The deep-link index may be used to search and retrieve content from social-networking system 160 via the social plug-in without leaving the user interface associated with the active third-party application (e.g., the third-party application that the user is currently viewing and/or interacting with). In addition, the deep-link index may be used to search and retrieve content from another third-party application via the social plug-in without leaving the user interface associated with the active third-party application. As an example and not by way of limitation, when searching for information associated with the entity of Mexico City, Mexico within a third-party travel-recommendation application, the social plug-in may retrieve a deep link to social-networking content associated with Mexico City (e.g., users who have visited Mexico City, users who have posted comments and/or pictures their visit to Mexico City, etc.) from a social-networking application, in addition to a deep link to weather information associated with Mexico City from a third-party weather application. Then, when the user selects to view the social-networking content (e.g., by selecting the interactive element associated with social-networking application), the social plug-in may execute the deep link associated with social-networking content to proceed directly to the appropriate place within the social-networking application for the social-networking content associated with Mexico City, and display this content on an interactive element interface (as described above). Alternatively, if the user selects to view the weather information (e.g., by selecting the interactive element associated with the third-party weather application), the social plug-in may execute the deep link associated with weather information to proceed directly to the appropriate place within the third-party weather application for weather information associated with Mexico City, and display this content on the interactive element interface (as described above). Although this disclosure describes using a deep-link index in a particular manner, this disclosure contemplates using the deep-link index in any suitable manner.

In particular embodiments, social-networking system 160 may receive, from a client device (e.g. client system 130) of a user (e.g., a first user) of the online social network, a query identifying an entity (e.g., a first entity) associated with the online social network. The query may be received from an application (e.g., a first application) of the client device via a social plug-in associated with the online social network. As an example and not by way of limitation, the first application may be an application associated with the online social network. As another example and not by way of limitation, the first application may be a third-party application. In particular embodiments, the first entity may correspond to a node of social graph 200 of the online social network. As discussed above, the entity may be a user of the online social network corresponding to a user node 202 of social graph 200, or the entity may be a concept associated with the online social network corresponding to a concept node 204 of social graph 200. As an example and not by way of limitation, referencing the example of FIG. 4C, when a user selects interactive element 440, a request is sent to social-networking system 160 for social-networking content corresponding to the entity of Mexico City, Mexico (e.g., a concept node 204). As another example and not by way of limitation, referencing the example of FIG. 5A, when the user selects interactive element 530, a request is sent to social-networking system 160 for social-networking content corresponding to the entity of Aria Sky Suites Hotel in Las Vegas, Nev. (e.g., a concept node 204).

In particular embodiments, social-networking system 160 may access a deep-link index of the online social network, the deep-link index including a plurality of records of indexed deep links to a plurality of third-party applications. Each record of the deep-link index may include an entity-identifier of an entity of the online social network, an application-identifier of a third-party application, and a deep link to the third-party application comprising instructions for accessing a display state of the third-party application associated with the entity (discussed in detail above). In particular embodiments, the entity-identifier of the entity of the online social network may include information for identifying a corresponding node (e.g., a first node) of social graph 200 of the online social network. As an example and not by way of limitation, as discussed above, the entity-identifier of the entity may include a social-network ID corresponding to a node (e.g., the first node) of the social graph 200 of the online social network, or alternatively, the entity-identifier of the entity may include a text-string description comprising one or more n-grams. In the example of FIG. 5A and TABLE 1 above, the entity-identifier for the entity "Aria Sky Suites Hotel" may be social-network ID "E01" or text-string "Aria Sky Suites Hotel Las Vegas Nev." In particular embodiments, the application-identifier of the third-party application may comprise information for identifying a corresponding node (e.g., a second node different from the first node) of social graph 200 of the online social network. As another example and not by way of limitation, as discussed above, the application-identifier may include a social-network ID corresponding to a node (e.g., the second node) of social graph 200 of the online social network, in which the corresponding node is associated with the third-party application. In the example of FIG. 5A and TABLE 1, the application-identifier of the third-party application may be social-network ID "App01," and this application-identifier may be associated with the node of social graph 200 that corresponds to the travel-recommendation application 510 (e.g., TravelAdvisor®). As yet another example and not by way of limitation, as discussed above, the deep link to the third-party application may be linked to the application-identifier of the third-party application. In addition, the deep link may include instructions for accessing a display state of the third-party application associated with the request. In the example of FIG. 5A and TABLE 1, the deep link for the entity "Aria Sky Suites Hotel" associated with application-identifier "App01" may be "Link01," and may include instructions for accessing a view state within third-party travel-recommendation application 510 that includes content on Aria Sky Suites Hotel in Las Vegas, Nev. Although this disclosure describes contents of the records of the deep-link index in a particular manner, this disclosure contemplates contents of the records of the deep-link index in any suitable manner.

In particular embodiments, social-networking system 160 may identify one or more records of the deep-link index having an entity-identifier matching the identified entity (e.g., the first entity) of the query. Then, social-networking system 160 may send, to the client device of the first user, one or more search results responsive to the query. The one or more of the search results may include deep links corresponding to one or more of the identified records. Each deep link may be selectable by the first user to access a display state of a third-party application associated with the first entity of the query. In particular embodiments, the one or more search results may be sent to the client device via a social plug-in, wherein the one or more search results are displayed within a first application of the client device. In particular embodiments, social-networking system 160 may retrieve, responsive to a selection of one of the search results by the first user, the deep link corresponding to the selected search result, and then execute, via the social plug-in, the retrieved deep link to present the view state of the third-party application associated with the first entity of the query on a user interface of the first application. The view state of the third-party application may be presented in an interactive element on the user interface. The interactive element may overlap at least a portion of user interface of the first application. The interactive element may be persistently displayed on the user interface until the client device receives a user input selecting the interactive element. In particular embodiments, the presenting of the view state of the third-party application further includes redirecting the first user from the user interface of the first application to a separate user interface of the third-party application. The user interface of the third-party application may encompass the entirety of a user interface of the client device. In particular embodiments, social-networking system 160 may identify the one or more records matching the identified entity by using a deep-link index that includes one or more of an application index and an entity index (discussed above).

In particular embodiments, social-networking system 160 may receive, concurrently with the entity query, a request from a third-party application via a social plug-in for social-networking information associated with the entity (e.g., a request from a third-party application for social-networking information). As an example and not by way of limitation, as shown in FIGS. 5A-5D, when social-networking system 160 receives a query via the social plug-in identifying the entity Aria Sky Suits Hotel in Las Vegas, Nev. and a request via the social plug-in for social-networking information (e.g., by a user selecting interactive element 530 associated with the online social network), social-networking system 160 may access the deep-link index to determine that this entity corresponds to entity identifier E01 associated with a node of social graph 200, and retrieve relevant social-networking content associated with this entity identifier (e.g., a list of friends of the user who have been to this hotel, posts of friends of the user while at this hotel, pictures of friends of the user taken while at the hotel, etc.). As another example and not by way of limitation, as shown in FIG. 4C, when social-networking system 160 receives a query via the social plug-in identifying the entity Mexico City, Mexico, and a request via the social plug-in for social-networking information (e.g., by a user selecting interactive element 440 associated with the online social network), social-networking system 160 may access the deep-link index to determine that this entity correspond to entity identifier E05 associated with a node of social graph 200, and retrieve relevant social-networking content associated with this entity identifier (e.g., a list of friends of the user who have visited Mexico City). In particular embodiments, the one or more search results (e.g., the retrieved social-networking content) may be sent to the client device via the social plug-in to be displayed within the third-party application. As discussed above, the social-networking content may be displayed in an interactive element interface (e.g., interactive element interface 442 of FIG. 4C and interactive element interface 540 of FIG. 5C).

In particular embodiments, social-networking system 160 may receive, concurrently with the entity query, a request from a third-party application via the social plug-in for third-party application information associated with the entity (e.g., a request from a first third-party application for information from a second third-party application different from the first third-party application). As an example and not by way of limitation, as shown in FIG. 9, when social-networking system 160 receives a query via the social plug-in identifying the entity of Mexico City, Mexico, and a request via the social plug-in for weather information from a third-party application (e.g., by a user selecting interactive element 920 associated with a third-party weather application), social-networking system 160 may access the deep-link index to determine that this entity corresponds to entity identifier E05 associated with a node of social graph 200. Social-networking system 160 may access the entity index (see TABLE 3, discussed above) to determine that entity identifier E05 includes three different deep links each corresponding to a different third-party application. Then, social-networking system 160 may determine that the third-party weather application associated with application identifier App03 and entity identifier E05 corresponds to the third-party application that provides weather information for Mexico City, Mexico, and determine that the deep link associated with this third-party weather application matches the query. In particular embodiments, social-networking system 160 may execute, via the social plug-in, the deep link associated with this third-party weather application that matches the query to present the display state of the third-party weather application associated with the entity Mexico City, Mexico. As discussed above, the weather information may be displayed in an interactive element interface (e.g., interactive element interface 442 of FIG. 4C and interactive element interface 540 of FIG. 5C).

In particular embodiments, social-networking system 160 receive, concurrently with the entity query, a request from a social-networking application via the social plug-in for third-party application information associated with the entity (e.g., a request from a social-networking application for information from a third-party application). As an example and not by way of limitation, the user interface of a social-networking application may include one or more interactive elements each associated with a particular third-party application (e.g., a third-party travel-recommendation application, a third-party language-translation application, a third-party weather application, etc.). When a user is using the social-networking application and views content associated with Mexico City, Mexico (e.g., viewing a post of a friend commenting on a recent trip to Mexico City, viewing a picture posted by a friend during a trip to Mexico City), the user may access third-party information associated with the content that he is viewing by selecting (e.g., pressing and/or tapping) one of the displayed interactive elements. As an example and not by way of limitation, the user selects to receive travel information by selecting the interactive element corresponding to a third-party travel-recommendation application. In response, social-networking system 160 receives a query via the social plug-in identifying the entity of Mexico City, Mexico, and a request via the social plug-in for travel information from the third-party application, and accesses the deep-link index to determine that this entity corresponds to entity identifier E05 associated with a node of social graph 200. Social-networking system 160 may access the entity index (see TABLE 3, discussed above) to determine that entity identifier E05 includes three different deep links each corresponding to a different third-party application. Then, social-networking system 160 may determine that the third-party travel-recommendation application associated with application identifier App01 and entity identifier E05 corresponds to the third-party application that provides travel information for Mexico City, Mexico, and determines that the deep-link associated with this third-party travel-recommendation application matches the query. In particular embodiments, social-networking system 160 may execute, via the social plug-in, the deep link associated with this third-party travel-recommendation application that matches the query to present the display state of the third-party travel-recommendation application associated with the entity Mexico City, Mexico. As discussed above, the travel information may be displayed in an interactive element interface (e.g., interactive element interface 442 of FIG. 4C and interactive element interface 540 of FIG. 5C). Although this disclosure describes searching and identifying records of the deep-link index in a particular manner, this disclosure contemplates searching and identifying records of the deep-link index in any suitable manner.

In particular embodiments, in the situation where multiple third-party applications are found in the search results as potentially supplying similar and/or the same content and information (e.g., providing a list of hotels corresponding to a particular geographic location, which can be found in both a third-party application associated with TravelAdvisor®, Travelocity®, Hotels.com®), the search results may be ranked based on particular and/or predetermined parameters, such as the quality of the third-party application (based on user statistics such as user dwell time, user engagement, etc.), whether the querying user has the third-party application installed on their device, advertising/sponsorship metrics, partnerships, user preference metrics, other suitable parameters, and any combination thereof. In addition, similar functionalities may be used when searching from third-party applications, where searches may be done via the social plug-in, and content related to a particular entity request by one third-party application may be sent to another third-party application.

In particular embodiments, prior to sending the one or more search results, social-networking system 160 may request authentication information from the client device to access the one or more search results. As discussed above, the authentication information may be sent via the social plug-in and not accessible by the third-party application. In particular embodiments, social-networking system 160 may rank the one or more search results based on a predetermined metric, and then present the one or more search results in ranked order based on their respective rankings. As an example and not by way of limitation, as discussed above, the one or more search results may be ranked based on a degree of separation between the entity associated with the identified record and the first entity of the query on a social graph 200 of the online social network. As another example and not by way of limitation, the one or more search results may be ranked based on a type of content associated with each search result (e.g., video content may be ranked higher than text content). Although this disclosure describes using a deep-link index in a particular manner, this disclosure contemplates using the deep-link index in any suitable manner.

Figure 12:
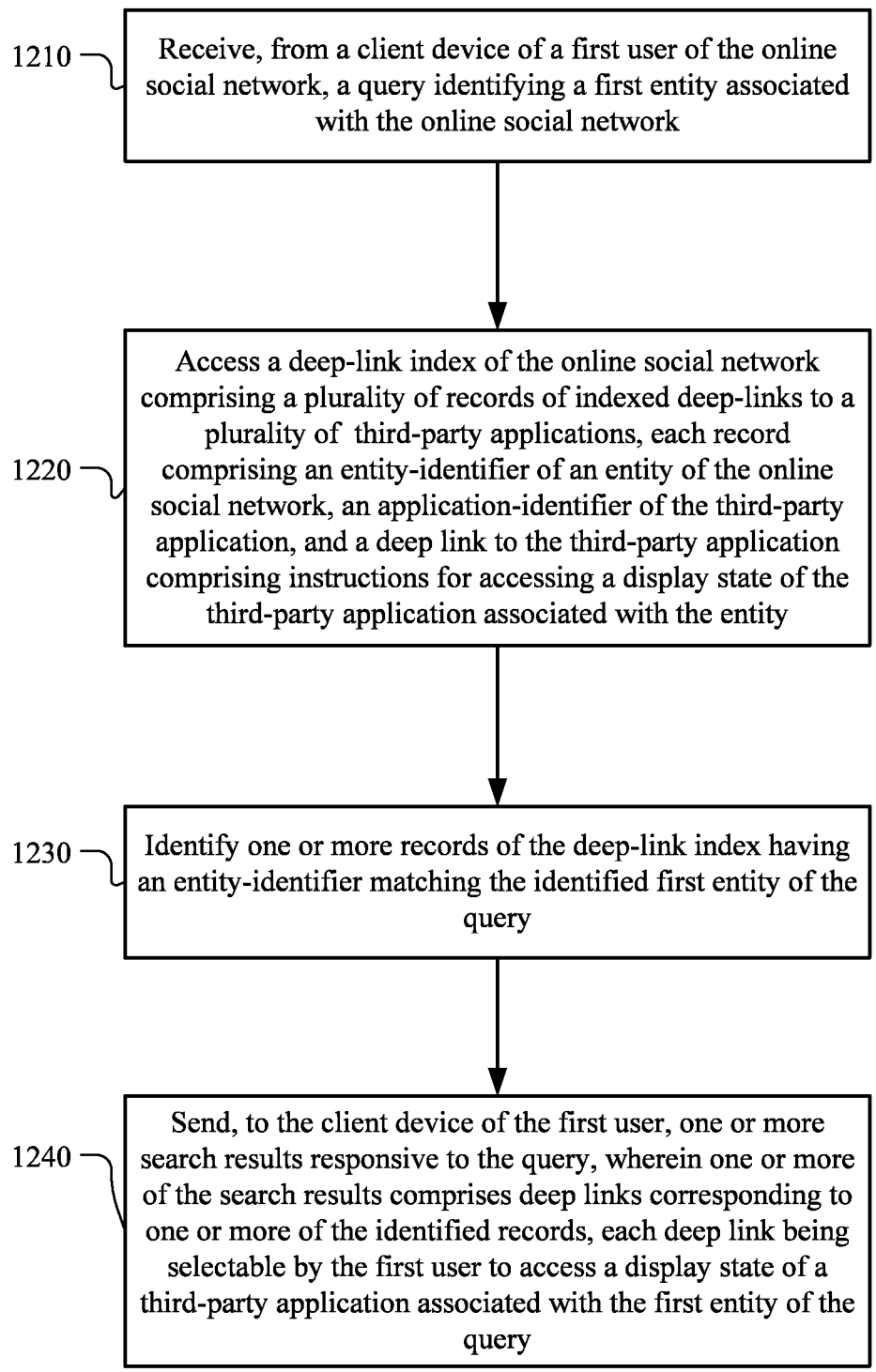
FIG. 12 illustrates an example method for using the generated deep-link index.

FIG. 12 illustrates an example method 1200 for using the generated deep-link index. The method may begin at step 1210, where social-networking system 160 may receive, from a client device of a first user of the online social network, a query identifying a first entity associated with the online social network. At step 1220, social-networking system 160 may access a deep-link index of the online social network including a plurality of records of indexed deep-links to a plurality of third-party applications. Each record may include an entity-identifier of an entity of the online social network, an application-identifier of the third-party application, and a deep link to the third-party application comprising instructions for accessing a display state of the third-party application associated with the entity. At step 1230, social-networking system 160 may identify one or more records of the deep-link index having an entity-identifier matching the identified first entity of the query. At step 1240, social-networking system 160 may send, to the client device of the first user, one or more search results responsive to the query. The one or more of the search results includes deep links corresponding to one or more of the identified records, each deep link being selectable by the first user to access a display state of a third-party application associated with the first entity of the query. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for using the generated deep-link index including the particular steps of the method of FIG. 12, this disclosure contemplates any suitable method for using the generated deep-link index including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, geographic location information, other suitable factors, or any combination thereof. In particular embodiments, different factors may be weighted differently when calculating the coefficient. The weights for each factor may be static or the weights may change according to, for example, the user, the type of relationship, the type of action, the user's geographic location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on geographic location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Systems and Methods

Figure 13:
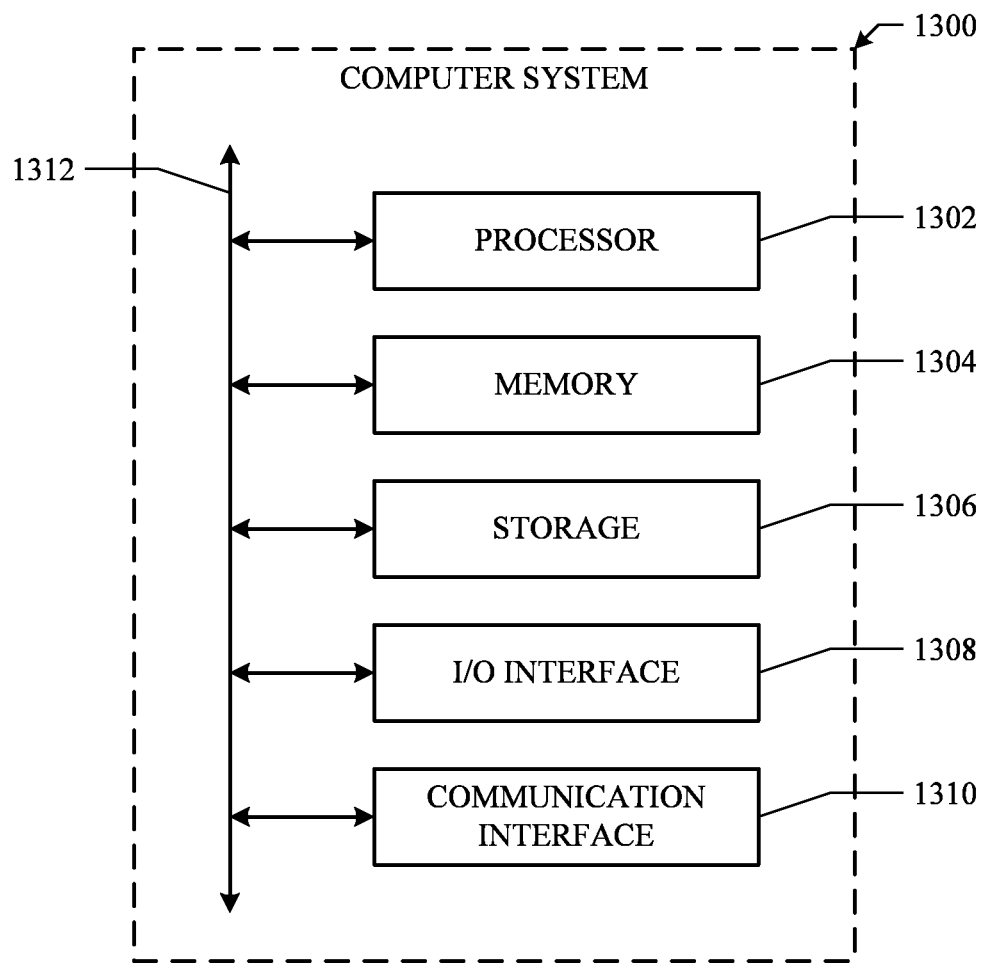
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:

receiving, from a first application of a first content provider and running on a client device of a first user, via a social plug-in that is associated with the online social network and linked to the first application, a request for content provided by a second content provider, the content being related to an entity of the online social network, wherein the first content provider is a third-party content provider that is separate from and external to the online social network, the request comprising:

an entity-identifier of the entity;

an application-identifier of the first application; and a deep link to the first application comprising instructions for accessing a display state of the first application associated with the request;

accessing a deep-link index of the online social network comprising a plurality of records indexing deep links to a plurality of mobile applications, wherein each record comprises an entity-identifier of a respective entity, an application-identifier associated with a respective content provider, and a deep link to a display state associated with the respective entity, the deep-link index being stored in one or more servers associated with the online social network;

generating a first record in the deep-link index corresponding to the entity, wherein the first record comprises the entity-identifier of the entity, the application-identifier of the first application, and the deep link to the first application; and sending, responsive to the request, to the first application on the client device via the social plug-in, instructions for displaying content from the second content provider related to the entity in the display state of the first application on a user interface of the first application by displaying:

a user interface of a second application of the second content provider overlapping a portion of the first application, wherein the user interface of the second application comprises the content from the second content provider and related to the entity, and a persistently displayed interactive element that toggles between the display of the user interface of the first application and the display of the user interface of the second application overlapping the portion of the first application.

2. The method of claim 1, wherein the second application is an application associated with the online social network.

3. The method of claim 1, wherein the second application is one of the plurality of the mobile applications.

4. The method of claim 1, wherein the entity corresponds to a node of a social graph of the online social network, the social graph comprising a plurality of nodes and a plurality of edges connecting the nodes, and each of the edges between two of the nodes representing a single degree of separation between them.

5. The method of claim 4, wherein the requested content comprises information associated with a first node of the social graph of the online social network that corresponds to the entity.

6. The method of claim 4, wherein the entity-identifier of the entity comprises a social-network identifier (ID) corresponding to a first node of the social graph of the online social network.

7. The method of claim 4, wherein the entity-identifier of the entity comprises a text-string description comprising one or more n-grams, and wherein the text-string description is parsed to determine a first node of the social graph of the online social network that corresponds to the entity.

8. The method of claim 4, wherein the application-identifier of the first application comprises a social-network identifier (ID) corresponding to a second node of the social graph of the online social network.

9. The method of claim 1, wherein the deep-link index comprises an application index, the application index being a forward index, and each record of the application index corresponds to a respective application and comprises:

a respective application-identifier (ID) of the application;

a respective entity-identifier (ID) of a respective entity of the online social network associated with the application;

one or more deep links corresponding to the respective application ID, each deep link comprising instructions to access a display state of the application; and respective metadata associated with each deep link, the respective metadata comprising information associated with a user interaction with the deep link.

10. The method of claim 9, wherein the metadata comprises information associated with one or more of:

one or more dwell times of each of one or more users of the online social network associated with each of the deep links; or a number of interactions of each of the one or more users associated with each of the deep links.

11. The method of claim 1, wherein the deep-link index comprises an entity index, the entity index being an inverted index, and each record of the entity index corresponds to a respective entity of the online social network and comprises:

a respective entity-identifier (ID) of the entity;

one or more deep links corresponding to the respective entity ID, each deep link comprising instructions to access a respective display state of a respective application associated with the entity; and respective metadata associated with each deep link, the respective metadata comprising information associated with a user interaction with the deep link.

12. The method of claim 11, wherein the metadata comprises information associated with one or more of:

one or more dwell times of each of one or more users of the online social network associated with each of the deep links; or a number of interactions of each of the one or more users associated with each of the deep links.

13. The method of claim 1, wherein the request further comprises authentication information for accessing the second content provider.

14. The method of claim 13, wherein the authentication information is sent via the social plug-in and not shared with the first application.

15. The method of claim 1, further comprising:

receiving the requested content from the second content provider, wherein the received content is sent via the social plug-in and not shared with the first application.

16. The method of claim 1, further comprising:

storing the deep-link index in a database associated with the online social network.

17. The method of claim 1, wherein the first application is a mobile application of the plurality of mobile applications.

18. The method of claim 1, wherein the first application is a third-party application that is separate from and external to the online social network.

19. The method of claim 1, wherein the request further comprises an indication of a type of data to be retrieved and displayed via the social plug-in in response to the request.

20. The method of claim 1, further comprising:

indexing a plurality of additional deep links in the first record in the deep-link index, each additional deep link corresponding to the entity and associated with a respective additional content provider, wherein each additional deep link indicates a respective display state of the respective additional content provider.

21. One or more computer-readable non-transitory storage media embodying software that is operable when executed to:
    receive, from a first application of a first content provider and running on a client device of a first user, via a social plug-in that is associated with an online social network and linked to the first application, a request for content provided by a second content provider, the content being related to an entity of the online social network, wherein the first content provider is a third-party content provider that is separate from and external to the online social network, the request comprising:
        an entity-identifier of the entity;
        an application-identifier of the first application; and
        a deep link to the first application comprising instructions for accessing a display state of the first application associated with the request;
    access a deep-link index of the online social network comprising a plurality of records indexing deep-links to a plurality of mobile applications, wherein each record comprises an entity-identifier of a respective entity, an application-identifier associated with a respective content provider, and a deep link to a display state associated with the respective entity, the deep-link index being stored in one or more servers associated with the online social network;
    generate a first record in the deep-link index corresponding to the entity, wherein the first record comprises the entity-identifier of the entity, the application-identifier of the first application, and the deep link to the first application; and
    send, responsive to the request, to the first application on the client device via the social plug-in, instructions for displaying content from the second content provider related to the entity in the display state of the first application on a user interface of the first application by displaying:
        a user interface of a second application of the second content provider overlapping a portion of the first application, wherein the user interface of the second application comprises the content from the second content provider and related to the entity, and
        a persistently displayed interactive element that toggles between the display of the user interface of the first application and the display of the user interface of the second application overlapping the portion of the first application.

22. A system comprising: one or more processors; and a memory coupled to the processors comprising instructions executable by the processors, the processors operable when executing the instructions to:
    receive, from a first application of a first content provider and running on a client device of a first user, via a social plug-in that is associated with an online social network and linked to the first application, a request for content provided by a second content provider, the content being related to an entity of the online social network, wherein the first content provider is a third-party content provider that is separate from and external to the online social network, the request comprising:
        an entity-identifier of the entity;
        an application-identifier of the first application; and
        a deep link to the first application comprising instructions for accessing a display state of the first application associated with the request;
    access a deep-link index of the online social network comprising a plurality of records indexing deep links to a plurality of mobile applications, wherein each record comprises an entity-identifier of a respective entity, an application-identifier associated with a respective content provider, and a deep link to a display state associated with the respective entity, the deep-link index being stored in one or more servers associated with the online social network; and
    generate a first record in the deep-link index corresponding to the entity, wherein the first record comprises the entity-identifier of the entity, the application-identifier of the first application, and the deep link to the first application; and
    send, responsive to the request, to the first application on the client device via the social plug-in, instructions for displaying content from the second content provider related to the entity in the display state of the first application on a user interface of the first application by displaying:
        a user interface of a second application of the second content provider overlapping a portion of the first application, wherein the user interface of the second application comprises the content from the second content provider and related to the entity, and
        a persistently displayed interactive element that toggles between the display of the user interface of the first application and the display of the user interface of the second application overlapping the portion of the first application.

\* \* \* \* \*